(12) United States Patent
Gao et al.

(10) Patent No.: US 10,939,190 B2
(45) Date of Patent: *Mar. 2, 2021

(54) PASSIVE OPTICAL NETWORK COMMUNICATIONS METHOD, APPARATUS AND SYSTEM

(71) Applicant: Huawei Technologies Co., Ltd., Shenzhen (CN)

(72) Inventors: Bo Gao, Wuhan (CN); Dekun Liu, Wuhan (CN); Xuming Wu, Wuhan (CN); Jianhe Gao, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,309

(22) Filed: Oct. 18, 2018

(65) Prior Publication Data

US 2019/0052940 A1 Feb. 14, 2019

Related U.S. Application Data

(63) Continuation of application No. 15/431,390, filed on Feb. 13, 2017, now Pat. No. 10,129,614, which is a
(Continued)

(51) Int. Cl.
*H04J 14/02* (2006.01)
*H04Q 11/00* (2006.01)
*H04B 10/073* (2013.01)

(52) U.S. Cl.
CPC ....... *H04Q 11/0005* (2013.01); *H04B 10/073* (2013.01); *H04J 14/02* (2013.01);
(Continued)

(58) Field of Classification Search
None
See application file for complete search history.

(56) References Cited

U.S. PATENT DOCUMENTS 9,647,791 B2   5/2017  Gao et al.
10,129,614 B2 * 11/2018  Gao ..................... H04B 10/073
(Continued)

FOREIGN PATENT DOCUMENTS

CN    101197637 A    6/2008
CN    102082976 A    6/2011
(Continued)

OTHER PUBLICATIONS

"Phoneline networking transceivers—Isolation function," ITU-T Recommendation G.9893, Series G: Transmission Systems and Media, Digital Systems and Networks, Digital sections and digital line system—Optical line systems for local and access networks, International Telecommunication Union, Geneva, Switzerland (Mar. 2003).
(Continued)

*Primary Examiner* — Li Liu
(74) *Attorney, Agent, or Firm* — Leydig, Voit & Mayer, Ltd.

(57) ABSTRACT

The present invention discloses a passive optical network communications method: reporting, by an optical network unit, ONU, a calibration record of the ONU, where the calibration record includes an ID of a calibrated wavelength channel; sending a first message to the ONU when the OLT determines, according to the calibration record, that a target wavelength channel ID corresponding to a target wavelength channel to which the ONU needs to switch is not in the calibration record, where the first message includes a forced wavelength switching flag; and instructing the ONU to switch to the calibrated target wavelength channel. In this way, the ONU can implement wavelength switching quickly after calibrating a new wavelength channel so as to perform data communication over the calibrated new wavelength channel.

23 Claims, 6 Drawing Sheets

Related U.S. Application Data continuation of application No. PCT/CN2014/084242, filed on Aug. 13, 2014.

(52) U.S. Cl.
CPC .......... *H04J 14/0242* (2013.01); *H04Q 11/00* (2013.01); *H04Q 11/0062* (2013.01); *H04Q 2011/0016* (2013.01); *H04Q 2011/0086* (2013.01)

(56) References Cited

U.S. PATENT DOCUMENTS

| | | |
|---|---|---|
| 2006/0062576 A1 | 3/2006 | Nakamura et al. |
| 2008/0166127 A1 | 7/2008 | Kazawa et al. |
| 2008/0304828 A1 | 12/2008 | Mizutani et al. |
| 2009/0136230 A1 | 5/2009 | Bouda |
| 2010/0221007 A1* | 9/2010 | Sakamoto ........... H04J 14/0226 398/67 |
| 2011/0091213 A1* | 4/2011 | Kawaza .............. H04J 14/0282 398/68 |
| 2011/0236017 A1 | 9/2011 | Ohlen |
| 2013/0094861 A1 | 4/2013 | Luo et al. |
| 2013/0094862 A1* | 4/2013 | Luo .................... H04J 14/0278 398/68 |
| 2013/0272699 A1* | 10/2013 | Liang ................. H04B 10/071 398/45 |
| 2013/0315589 A1 | 11/2013 | Gao et al. |
| 2014/0133863 A1 | 5/2014 | Mizutani |
| 2014/0161456 A1 | 6/2014 | Sugawa et al. |
| 2015/0023664 A1 | 1/2015 | Mukai et al. |
| 2015/0098704 A1 | 4/2015 | Gao et al. |
| 2016/0087748 A1* | 3/2016 | Khotimsky .......... H04B 10/272 398/67 |
| 2016/0088377 A1 | 3/2016 | Peng et al. |
| 2017/0026111 A1 | 1/2017 | Yoo et al. |
| 2017/0155449 A1 | 6/2017 | Huang et al. |
| 2017/0170898 A1* | 6/2017 | Fu ........................ H04J 14/02 |
| 2017/0207876 A1 | 7/2017 | Gao et al. |

FOREIGN PATENT DOCUMENTS

| | | | |
|---|---|---|---|
| CN | 103391486 A | 11/2013 | |
| CN | 103444111 A | 12/2013 | |
| CN | 103916179 A | 7/2014 | |
| JP | 2013229743 A | 11/2013 | |
| WO | 2012096630 A1 | 7/2012 | |
| WO | 2012103849 A2 | 8/2012 | |
| WO | WO2012103849 * | 8/2012 | ............. H04B 10/08 |

OTHER PUBLICATIONS

CN/2019104129781, Search Report, dated Feb. 21, 2020.

U.S. Appl. No. 15/431,390, filed Feb. 13, 2017.

\* cited by examiner

PASSIVE OPTICAL NETWORK COMMUNICATIONS METHOD, APPARATUS AND SYSTEM

CROSS-REFERENCE TO RELATED APPLICATIONS

This application is a continuation of U.S. patent application Ser. No. 15/431,390, filed on Feb. 13, 2017, which is a continuation of International Application No. PCT/CN2014/084242, filed on Aug. 13, 2014. All of the afore-mentioned patent applications are hereby incorporated by reference in their entireties.

TECHNICAL FIELD

Embodiments of the present invention relate to the field of optical communications technologies, and in particular, to a passive optical network communications method, apparatus and system.

BACKGROUND

A passive optical network (PON) technology is a point-to-multipoint fiber access technology. With continuous development of technologies, an EPON (Ethernet Passive Optical Network), a GPON (Gigabit passive Optical Network), an NG PON (next generation PON), and the like emerge. To ensure network reliability, a PON network needs to support fast switching. FIG. 1 shows a PON network architecture, which includes a first OLT 10 (Optical Line Terminal), a second OLT 12, an ODN (Optical Distribution Network), and ONUs (Optical Network Unit). When the first OLT 10 serves as an active OLT, a feeder fiber between an active port on the first OLT 10 and the ODN is an active feeder fiber, and a feeder fiber between a standby port on the second OLT 12 and the ODN is a standby feeder fiber. In a case in which the active feeder fiber or the active port is faulty, switching to the standby port needs to be performed to recover a service and implement protection for the feeder fiber.

In order to further extend application of the PON, a time wavelength division multiplexing-passive optical network (TWDM-PON) is put forward in the industry. The TWDM-PON is a passive optical network that combines both WDM and TDM technologies, and includes an office-side OLT, a user-side ONU or ONT (optical network terminal), and an ODN.

After initial access to a system, an existing ONU performs automatic calibration to implement alignment of all available receive and transmit wavelengths of the OLT. However, when new wavelength channels are required subsequently due to a gradual increase of users and a service scale, the new wavelength channels are not calibrated by the ONU, so that the ONU is unable to switch to a new wavelength channel to perform data communication, which further leads to inefficient use of the new wavelength channels and drastic waste of bandwidth.

SUMMARY

Embodiments of the present invention provide a PON communications method, and a related device and system to solve an issue of performing data communication by using a new wavelength channel, which enables an ONU to implement wavelength switching quickly after calibrating a new wavelength channel so as to perform data communication over the calibrated new wavelength channel, thereby expanding capacity of a system effectively by using the new wavelength channel and improving a bandwidth utilization rate of the system.

According to a first aspect, data communications method in a passive optical network is provided, where the method includes: receiving, by an optical line terminal OLT, a calibration record reported by an optical network unit ONU, where the calibration record includes an ID of a calibrated wavelength channel; sending a first message to the ONU when the OLT determines, according to the calibration record, that a target wavelength channel ID corresponding to a target wavelength channel to which the ONU needs to switch is not in the calibration record, where the first message includes a forced wavelength switching flag, where the forced wavelength switching flag is used to instruct the ONU to perform wavelength channel calibration for the target wavelength channel to switch to and instruct the ONU to switch to the calibrated target wavelength channel; and receiving data sent by the ONU over the calibrated target wavelength channel.

With reference to the first aspect, in a first possible implementation manner of the first aspect, the first message further includes a forced calibration flag that is used to instruct the ONU to switch to the target wavelength channel after calibrating all new wavelength channels, where new wavelength channel IDs corresponding to the new wavelength channels are not in the calibration record, and the new wavelength channels include the target wavelength channel.

With reference to the first aspect, in a second possible implementation manner of the first aspect, the receiving, by an OLT, a calibration record reported by an ONU specifically includes:

sending, by the OLT, a second message to the ONU, where the second message includes a quiet window and is used to instruct the ONU to register within the quiet window; and receiving, within the quiet window, a registration request reported by the ONU, where the registration request includes a sequence number of the ONU and the calibration record.

With reference to the first aspect, in a third possible implementation manner of the first aspect, the calibration record includes at least one of an ID of a calibrated upstream wavelength channel and an ID of a calibrated downstream wavelength channel.

With reference to the first aspect, in a fourth possible implementation manner of the first aspect, the calibration record further includes at least one of a quantity of calibrated downstream wavelength channels and a quantity of calibrated upstream wavelength channels.

With reference to the first aspect, in a fifth possible implementation manner of the first aspect, the method further includes: determining, by the OLT according to the calibration record, that an OLT-expected wavelength channel ID is in the calibration record, and then allowing the ONU to register, where the OLT-expected wavelength channel ID is an operating wavelength channel ID allocated by the OLT to the ONU.

With reference to the first aspect, in a sixth possible implementation manner of the first aspect, the method further includes: sending a third message to the ONU when an OLT-expected wavelength channel ID is not in the calibration record, so as to request the ONU to perform wavelength channel calibration for a wavelength channel identified by the OLT-expected wavelength channel ID, where the OLT-expected wavelength channel ID is an operating wavelength channel ID allocated by the OLT to the ONU.

With reference to the first aspect, in a seventh possible implementation manner of the first aspect, the third message further includes an expected wavelength channel indication bit and is used to instruct the ONU to perform wavelength channel calibration for the OLT-expected wavelength channel and use the calibrated OLT-expected wavelength channel as an operating wavelength channel of the ONU.

With reference to the first aspect, in an eighth possible implementation manner of the first aspect, the method further includes: sending a fourth message to the ONU when an OLT-expected wavelength channel ID is not in the calibration record, where the fourth message includes a wavelength channel calibration indication bit and is used to instruct the ONU to calibrate all new wavelength channels or instruct the ONU to calibrate a specified new wavelength channel, where the all new wavelength channels include an OLT-expected wavelength channel identified by the OLT-expected wavelength channel ID and the specified new wavelength channel, and the specified new wavelength channel is determined according to an ID of a to-be-calibrated wavelength channel in the fourth message or determined according to a quantity of to-be-calibrated wavelength channels and IDs of the to-be-calibrated wavelength channels in the fourth message.

With reference to the first aspect, in a ninth possible implementation manner of the first aspect, the method further includes: sending a fifth message to the ONU when an OLT-expected wavelength channel ID is not in the calibration record, where the fifth message includes an ONU deactivation indication bit and is used to instruct the ONU to get deactivated and then calibrate all new wavelength channels before re-registration, where the all new wavelength channels include an OLT-expected wavelength channel identified by the OLT-expected wavelength channel ID.

According to a second aspect, a data communications method in a passive optical network is provided, where the method includes:

reporting, by an optical network unit ONU, a calibration record to an optical line terminal OLT, where the calibration record includes an ID of a calibrated wavelength channel;

receiving, by the ONU, a first message sent by the OLT, where the first message includes a forced wavelength switching flag; performing, by the ONU according to the forced wavelength switching flag, wavelength channel calibration for a target wavelength channel to switch to, and switching to the calibrated target wavelength channel; and performing, by the ONU, data communication with the OLT over the switched-to target wavelength channel.

With reference to the second aspect, in a first possible implementation manner of the second aspect, the first message further includes a forced calibration flag, and the method further includes:

calibrating, by the ONU, all new wavelength channels according to the forced calibration flag, and switching to the target wavelength channel, where new wavelength channel IDs corresponding to the new wavelength channels are not in the calibration record, and the new wavelength channels include the target wavelength channel.

With reference to the second aspect, in a second possible implementation manner of the second aspect, the reporting, by an ONU, a calibration record to an OLT specifically includes:

receiving, by the ONU, a second message sent by the OLT, where the second message includes a quiet window;

sending, by the ONU within the quiet window, a registration request to the OLT, where the registration request includes a sequence number of the ONU and the calibration record, where the calibration record is generated by the ONU; and receiving, within the quiet window, the sequence number of the ONU and the calibration record that are reported by the ONU.

With reference to the second aspect, in a third possible implementation manner of the second aspect, the calibration record includes at least one of an ID of a calibrated upstream wavelength channel and an ID of a calibrated downstream wavelength channel.

With reference to the second aspect, in a fourth possible implementation manner of the second aspect, the calibration record further includes at least one of a quantity of calibrated downstream wavelength channels and a quantity of calibrated upstream wavelength channels.

the method further includes:

receiving, by the ONU, a third message sent by the OLT; and

With reference to the second aspect, in a fourth possible implementation manner of the second aspect, the method further includes:

performing, by the ONU according to the third message, wavelength channel calibration for a wavelength channel identified by an OLT-expected operating wavelength channel ID, where the OLT-expected wavelength channel ID is an operating wavelength channel ID allocated by the OLT to the ONU.

With reference to the second aspect and the fourth possible implementation manner of the second aspect, in a fourth possible implementation manner of the second aspect, the third message further includes an expected wavelength channel indication bit; and the method further includes:

performing, by the ONU according to the expected wavelength channel indication bit, wavelength channel calibration for the OLT-expected wavelength channel and using the calibrated OLT-expected wavelength channel as an operating wavelength channel of the ONU.

With reference to the second aspect, in a fifth possible implementation manner of the second aspect, the method further includes:

receiving, by the ONU, a fourth message sent by the OLT, where the fourth message includes a wavelength channel calibration indication bit; and calibrating, by the ONU, all new wavelength channels according to the wavelength channel calibration indication bit; or calibrating, by the ONU, a specified new wavelength channel according to the wavelength channel calibration indication bit, where the all new wavelength channels include an OLT-expected wavelength channel identified by an OLT-expected wavelength channel ID and the specified new wavelength channel, and the specified new wavelength channel is a wavelength channel specified according to an ID of a to-be-calibrated wavelength channel in the fourth message or is a wavelength channel specified according to a quantity of to-be-calibrated wavelength channels and IDs of the to-be-calibrated wavelength channels in the fourth message.

With reference to the second aspect, in a sixth possible implementation manner of the second aspect, the method further includes:

receiving, by the ONU, a fourth message sent by the OLT, where the fourth message includes a wavelength channel calibration indication bit; and calibrating, by the ONU, all new wavelength channels according to the wavelength channel calibration indication bit; or calibrating, by the ONU, a specified new wavelength channel according to the wavelength channel calibration indication bit, where the all new wavelength channels include an OLT-expected wavelength channel identified by an OLT-expected wavelength channel ID and the specified new wavelength channel, and the specified new wavelength channel is a wavelength channel specified according to an ID of a to-be-calibrated wavelength channel in the fourth message or is a wavelength channel specified according to a quantity of to-be-calibrated wavelength channels and IDs of the to-be-calibrated wavelength channels in the fourth message.

With reference to the second aspect, in a seventh possible implementation manner of the second aspect, the method further includes:

receiving, by the ONU, a fifth message sent by the OLT, where the fifth message includes an ONU deactivation indication bit; and calibrating, by the ONU, all new wavelength channels according to the ONU deactivation indication bit before re-registration, where the new wavelength channels include an OLT-expected wavelength channel identified by an OLT-expected wavelength channel ID, where the OLT-expected wavelength channel ID is an operating wavelength channel ID allocated by the OLT to the ONU.

According to a third aspect, a passive optical network communications apparatus is provided, where the communications apparatus includes:

a first communications unit, configured to: receive a calibration record reported by an optical network unit ONU, where the calibration record includes an ID of a calibrated wavelength channel; send a first message to the ONU according to an instruction of a first processing unit, where the first message includes a forced wavelength switching flag, where the forced wavelength switching flag is used to instruct the ONU to perform wavelength channel calibration for a target wavelength channel to switch to and instruct the ONU to switch to the calibrated target wavelength channel; and receive data sent by the ONU over the calibrated target wavelength channel; and the first processing unit, configured to: when the OLT determines, according to the calibration record, that a target wavelength channel ID corresponding to the target wavelength channel to which the ONU needs to switch is not in the calibration record, instruct the first communications unit to send the first message to the ONU.

For details of other implementation manners of the third aspect, reference may be made to the method provided in the implementation manners of the first aspect.

According to a fourth aspect, a passive optical network communications apparatus is provided, where the communications apparatus includes:

a second communications unit, configured to: report a calibration record to an optical line terminal OLT, where the calibration record includes an ID of a calibrated wavelength channel;

and receive a first message sent by the OLT, where the first message includes a forced wavelength switching flag; and a second processing unit, configured to: perform, according to the forced wavelength switching flag, wavelength channel calibration for a target wavelength channel to switch to, and switch to the calibrated target wavelength channel; and perform, by the ONU, data communication with the OLT over the switched-to target wavelength channel.

For details of other implementation manners of the fourth aspect, reference may be made to the method provided in the implementation manners of the second aspect.

According to a fifth aspect, a passive optical network system is provided, where the system includes the apparatus provided in the third aspect and the apparatus provided in the fourth aspect.

From the foregoing description, it can be seen that, in the implementation manners of the present invention, an ONU reports a calibration record of the ONU, where the calibration record includes an ID of a calibrated wavelength channel; an OLT sends a first message to the ONU when determining, according to the calibration record, that a target wavelength channel ID corresponding to a target wavelength channel to which the ONU needs to switch is not in the calibration record, where the first message includes a forced wavelength switching flag; the ONU performs, according to the forced wavelength switching flag, wavelength channel calibration for the target wavelength channel to switch to, and instructs the ONU to switch to the calibrated target wavelength channel. In this way, the ONU can implement wavelength switching quickly after calibrating a new wavelength channel so as to perform data communication over the calibrated new wavelength channel, thereby expanding a capacity of a system by effectively using the new wavelength channel and improving bandwidth utilization of the system.

BRIEF DESCRIPTION OF DRAWINGS

To describe the technical solutions in the embodiments of the present invention more clearly, the following briefly introduces the accompanying drawings required for describing the embodiments and the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a PON communications method, related devices, and a PON to improve available efficiency of a link between PON devices in a PON and improve a data transmission rate.

To make the invention objectives, features, and advantages of the present invention clearer and more comprehensible, the following clearly and completely describes the technical solutions in the embodiments of the present invention with reference to the accompanying drawings in the embodiments of the present invention. Apparently, the embodiments described in the following are merely a part rather than all of the embodiments of the present invention. All other embodiments obtained by a person of ordinary skill in the art based on the embodiments of the present invention without creative efforts shall fall within the protection scope of the present invention.

Figure 1:
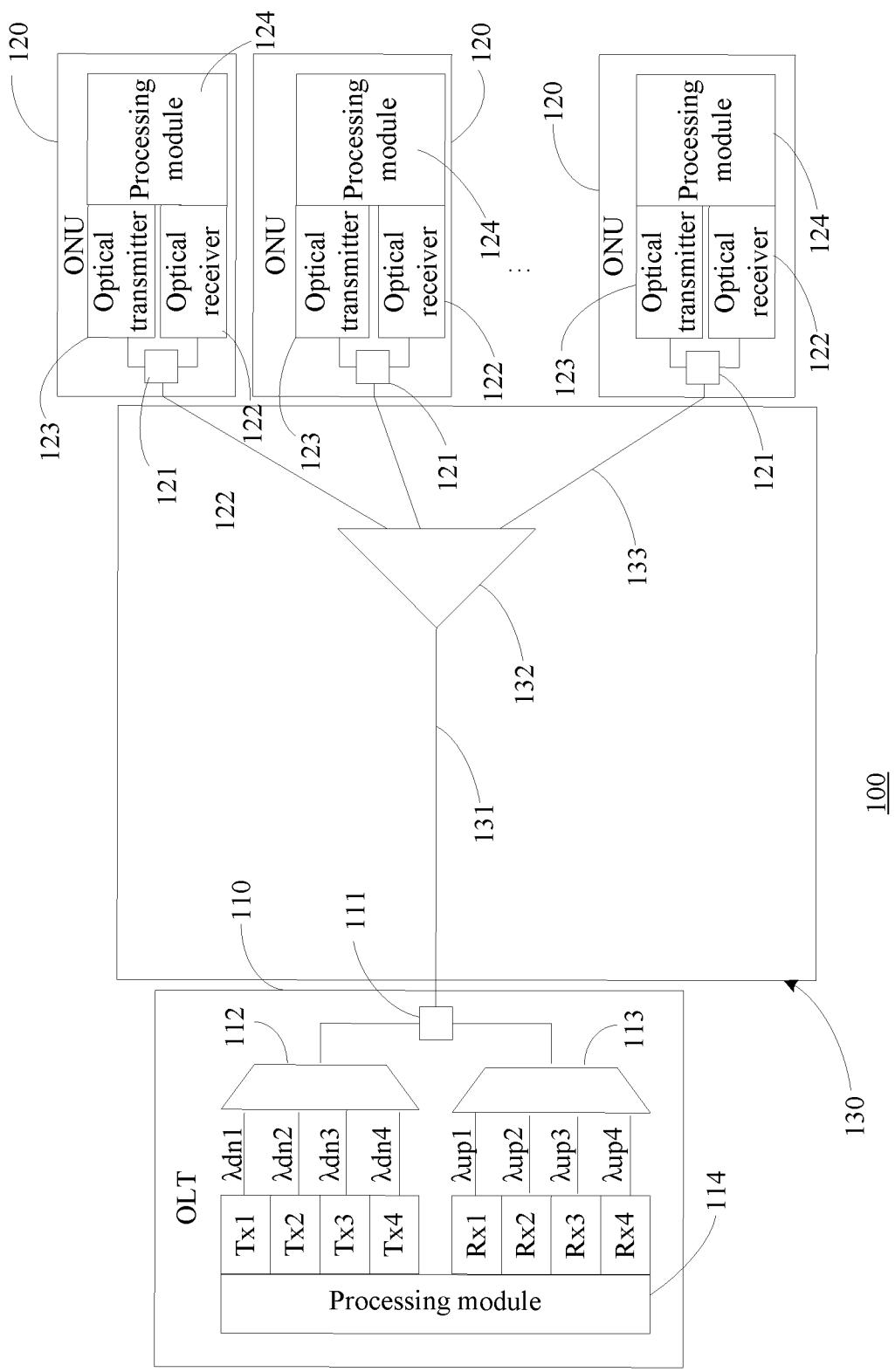
FIG. 1 is a schematic diagram of a network architecture of a TWDM-PON system according to an embodiment of the present invention.

FIG. 1 is a schematic diagram of a network architecture of a TWDM-PON system. As shown in FIG. 1, a TWDM-PON system 100 includes one OLT 110, multiple ONUs 120, and an optical distribution network (ODN) 130, where the OLT 110 is connected to the multiple ONUs 120 via the ODN 130 in a point-to-multipoint manner. The TWDM-PON system 100 may further include more than one OLT. The multiple ONUs 120 share an optical transmission medium of the ODN 130. The ODN 130 may include a feeder fiber 131, an optical power splitting module 132, and multiple distribution fibers 133. The optical power splitting module 132 may be disposed on a remote node (Remote Node, RN), and is connected to the OLT 110 by using the feeder fiber 131 and also connected to the multiple ONUs 120 by using the multiple distribution fibers 133. In the TWDM-PON system 100, a communications link between the OLT 110 and the multiple ONUs 120 may include multiple operating wavelength channels, and the multiple operating wavelength channels share the optical transmission medium of the ODN 130 in a WDM manner. Each ONU 120 may work on one operating wavelength channel of the TWDM-PON system 100, and each operating wavelength channel may carry services of one or more ONUs 120. In addition, ONUs 120 that work on a same operating wavelength channel may share the wavelength channel in a time division multiplexing TDM manner. In FIG. 1, that the TWDM-PON system 100 has four operating wavelength channels is used as an example for description. It should be understood that, in practical application, a quantity of operating wavelength channels of the TWDM-PON system 100 may also be determined according to a network need.

It should be understood that, in the embodiments of the present invention, a transmission direction in which data or an optical signal that carries the data is transmitted from an OLT to an ONT/ONU is called a downstream direction, and correspondingly, the optical signal sent by the OLT to the ONT/ONU is also called a downstream optical signal. Similarly, a transmission direction in which data or an optical signal that carries the data is transmitted from the ONT/ONU to the OLT is called an upstream direction, and correspondingly, the optical signal sent by the ONT/ONU to the OLT is also called an upstream optical signal.

For ease of description, the four operating wavelength channels of the TWDM-PON system 100 in FIG. 1 are named operating wavelength channel 1, operating wavelength channel 2, operating wavelength channel 3, and operating wavelength channel 4. Each operating wavelength channel uses one pair of upstream and downstream wavelengths. For example, operating wavelength channel 1 includes an upstream operating wavelength channel and a downstream operating wavelength channel, where an upstream operating wavelength corresponding to the upstream operating wavelength channel is $\lambda up1$, and a downstream operating wavelength corresponding to the downstream operating wavelength channel may be $\lambda dn1$; operating wavelength channel 2 includes an upstream operating wavelength channel and a downstream operating wavelength channel, where an upstream operating wavelength corresponding to the upstream operating wavelength channel is $\lambda up2$, and a downstream operating wavelength corresponding to the downstream operating wavelength channel may be $\lambda dn2$; operating wavelength channel 3 includes an upstream operating wavelength channel and a downstream operating wavelength channel, where an upstream operating wavelength corresponding to the upstream operating wavelength channel is $\lambda up3$, and a downstream operating wavelength corresponding to the downstream operating wavelength channel may be $\lambda dn3$; operating wavelength channel 4 includes an upstream operating wavelength channel and a downstream operating wavelength channel, where an upstream operating wavelength corresponding to the upstream operating channel is $\lambda up4$, and a downstream operating wavelength corresponding to the downstream operating wavelength channel is $\lambda dn4$. Each operating wavelength channel may have a corresponding operating wavelength channel ID (for example, channel numbers of the four wavelength channels may be 1, 2, 3, and 4). That is, an operating wavelength channel ID is in a matching relationship with an upstream or a downstream wavelength corresponding to an operating wavelength channel identified by the operating wavelength channel ID, and the OLT 110 and the ONUs 120 can learn, according to an operating wavelength channel ID, an upstream operating wavelength and a downstream operating wavelength that are corresponding to an operating wavelength channel.

The OLT 110 may include an optical coupler 111, a first wavelength division multiplexer 112, a second wavelength division multiplexer 113, multiple downstream optical transmitters Tx1-Tx4, multiple upstream optical receivers Rx1-Rx4, and a processing module 114. The multiple downstream optical transmitters Tx1-Tx4 are connected to the optical coupler 111 via the first wavelength division multiplexer 112, the multiple upstream optical receivers Rx1-Rx4 are connected to the optical coupler 111 via the second wavelength division multiplexer 113, and the coupler 111 is further connected to the feeder fiber 131 of the ODN 130.

Transmit wavelengths vary between the multiple downstream optical transmitters Tx1-Tx4. Each downstream optical transmitter of Tx1-Tx4 may correspond to one wavelength channel of the TWDM-PON system 100. For example, the transmit wavelengths of the multiple downstream optical transmitters Tx1-Tx4 may be $\lambda d1$-$\lambda d4$ respectively. The downstream optical transmitters Tx1-Tx4 may use their respective transmit wavelengths $\lambda d1$-$\lambda d4$ to transmit downstream data to corresponding wavelength channels so that the downstream data can be received by the ONUs 120 that work on the corresponding wavelength channels. Correspondingly, receive wavelengths may vary between the multiple upstream optical receivers Rx1-Rx4. Each upstream optical receiver of Rx1-Rx4 also corresponds to one wavelength channel of the TWDM-PON system 100. For example, the receive wavelengths of the multiple upstream optical receivers Rx1-Rx4 may be $\lambda u1$-$\lambda u4$ respectively. The upstream optical receivers Rx1-Rx4 may use their respective receive wavelengths $\lambda u1$-$\lambda u4$ to receive upstream data sent by the ONUs 120 that work on corresponding wavelength channels.

The first wavelength division multiplexer 112 is configured to perform wavelength division multiplexing for the downstream data that is transmitted by the multiple downstream optical transmitters Tx1-Tx4 and whose wavelengths are λd1-λd4, and send the downstream data to the feeder fiber 131 of the ODN 130 via the optical coupler 111, so as to provide the downstream data for the ONUs 120 via the ODN 130. In addition, the optical coupler 111 may be further configured to provide the second wavelength division multiplexer 113 with the upstream data that comes from the multiple ONUs 120 and whose wavelengths are λu1-λu4, and the second wavelength division multiplexer 113 may demultiplex the upstream data whose wavelengths are λu1-λu4 to the upstream optical receivers Rx1-Rx4 so as to implement data reception.

The processing module 114 may be a media access control (MAC) module. On the one hand, the processing module may specify operating wavelength channels for the multiple ONUs 120 by means of wavelength negotiation, and according to an operating wavelength channel of one ONU 120, provide downstream data, which is to be sent to the ONU 120, for the downstream optical transmitters Tx1-Tx4 corresponding to the wavelength channel, so that the downstream optical transmitters Tx1-Tx4 transmit the downstream data to the corresponding wavelength channel; on the other hand, the processing module 114 may further perform dynamic bandwidth allocation (DBA) for upstream transmission for each wavelength channel, and allocate an upstream transmit timeslot to ONUs 120 that are multiplexed to a same wavelength channel in a TDM manner, so as to authorize the ONUs 120 to send upstream data in the specified timeslot through the corresponding wavelength channel.

The upstream transmit wavelength and the downstream receive wavelength of each ONU 120 are adjustable. According to a wavelength channel specified by the OLT 110, an ONU 120 may adjust its own upstream transmit wavelength and downstream receive wavelength respectively to an upstream operating wavelength and a downstream operating wavelength that are corresponding to the operating wavelength channel, so as to implement upstream and downstream data transmission and reception by using the wavelength channel. For example, if the OLT 110 instructs, in a wavelength negotiation process, one ONU 120 to work on wavelength channel 1, the ONU 120 may adjust its own upstream transmit wavelength and downstream receive wavelength to a first upstream operating wavelength λup1 and a first downstream operating wavelength λdn1 respectively; if the OLT 110 instructs the ONU 120 to work on wavelength channel 3, the ONU 120 may adjust its own upstream transmit wavelength and downstream receive wavelength to a third upstream operating wavelength λup3 and a third downstream operating wavelength λdn3 respectively.

The ONU 120 may include an optical coupler 121, a downstream optical receiver 122, an upstream optical transmitter 123, and a processing module 124. The downstream optical receiver 122 and the upstream optical transmitter 123 are connected to a distribution fiber 133 corresponding to the ONU 120 via the optical coupler 121. On the one hand, the optical coupler 121 may provide the distribution fiber 133 of the ODN 130 with upstream data sent by the upstream optical transmitter 123, so as to send the upstream data to the OLT 110 via the ODN 130; on the other hand, the optical coupler 121 may further provide the downstream optical receiver 122 with downstream data sent by the OLT 110 via the ODN 130, so as to implement data reception.

The processing module 124 may be a media access control MAC module or a microprocessor, and may perform wavelength negotiation with the OLT 110, and according to an operating wavelength channel specified by the OLT 110, adjust a receive wavelength of the downstream optical receiver 122 and a transmit wavelength of the upstream optical transmitter 123 (that is, adjust the downstream receive wavelength and upstream transmit wavelength of the ONU 120), so that the ONU 120 works on the operating wavelength channel specified by the OLT 110. In addition, the processing module 124 may further control, according to a dynamic bandwidth allocation result of the OLT 110, the upstream optical transmitter 123 to send upstream data in a specified timeslot.

It should be understood that in the embodiments of the present invention, the passive optical network communications method, apparatus and system according to the embodiments of the present invention may be applied in a time division or wavelength division passive optical network system, for example, a GPON system, a 10G GPON system, a 40G GPON system, an Ethernet passive optical network (EPON) system, a 10G EPON system or a wavelength division multiplexing passive optical network WDM PON system. For ease of description, a GPON system is used as an example for description below, but the present invention is not limited thereto. In addition, for ease of description, an optical network unit (ONU) is used for description below in place of an optical network terminal (ONT) and/or an optical network unit, but the present invention is not limited thereto.

Embodiment 1

Figure 2:
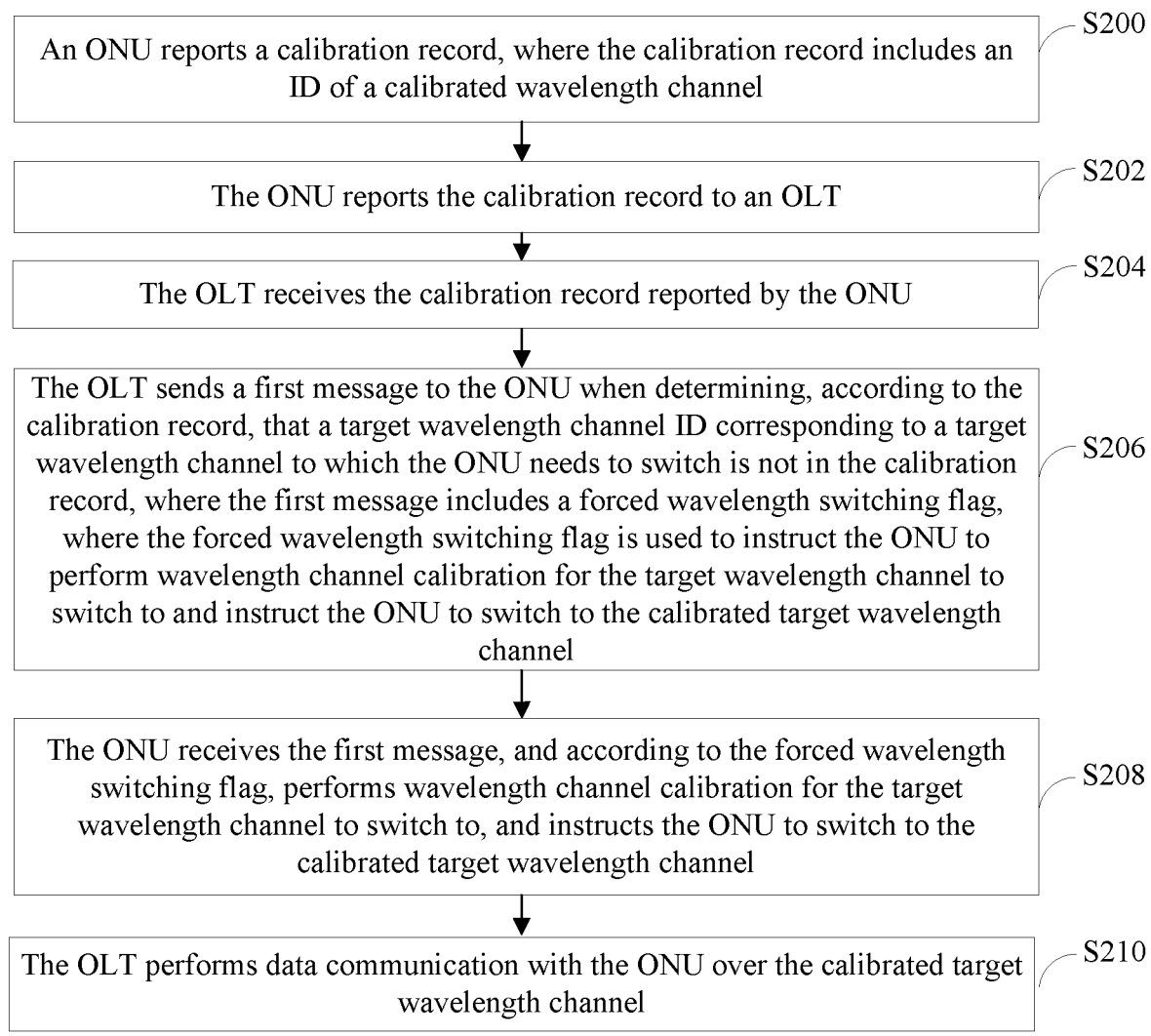
FIG. 2 is a data communications method in a passive optical network according to an embodiment of the present invention.

As shown in FIG. 2, FIG. 2 is a data communications method in a passive optical network according to an embodiment of the present invention. The method may be based on the foregoing network architecture in FIG. 1. The method includes:

S200. An ONU reports a calibration record, where the calibration record includes an ID of a calibrated wavelength channel.

Further, that an ONU reports a calibration record specifically includes:

sending, by an OLT, a second message to the ONU, where the second message includes a quiet window and is used to instruct the ONU to register within the quiet window; and receiving, within the quiet window, a registration request reported by the ONU, where the registration request includes a sequence number of the ONU and the calibration record.

Further, the calibration record includes at least one of an ID of a calibrated upstream wavelength channel and an ID of a calibrated downstream wavelength channel.

Further, the calibration record further includes at least one of a quantity of calibrated downstream wavelength channels and a quantity of calibrated upstream wavelength channels.

S202. The ONU reports the calibration record to an OLT.

Further, that the ONU reports the calibration record to an OLT specifically includes:

receiving, by the ONU, a second message sent by the OLT, where the second message includes a quiet window;

sending, by the ONU within the quiet window, a registration request to the OLT, where the registration request includes a sequence number of the ONU and the calibration record, where the calibration record is generated by the ONU; and receiving, within the quiet window, the sequence number of the ONU and the calibration record that are reported by the ONU.

S204. The OLT receives the calibration record reported by the ONU.

Further, the method may further include: determining, by the OLT according to the calibration record, that an OLT-expected wavelength channel ID is in the calibration record, and then allowing the ONU to register, where the OLT-expected wavelength channel ID is an operating wavelength channel ID allocated by the OLT to the ONU.

S206. The OLT sends a first message to the ONU when the OLT determines, according to the calibration record, that a target wavelength channel ID corresponding to a target wavelength channel to which the ONU needs to switch is not in the calibration record, where the first message includes a forced wavelength switching flag, where the forced wavelength switching flag is used to instruct the ONU to perform wavelength channel calibration for the target wavelength channel to switch to and instruct the ONU to switch to the calibrated target wavelength channel.

Further, the first message further includes a forced calibration flag that is used to instruct the ONU to switch to the target wavelength channel after calibrating all new wavelength channels, where new wavelength channel IDs corresponding to the new wavelength channels are not in the calibration record, and the new wavelength channels include the target wavelength channel.

Further, the OLT sends a second message to the ONU, where the second message includes a quiet window and is used to instruct the ONU to register within the quiet window; and receives, within the quiet window, a registration request reported by the ONU, where the registration request includes a sequence number of the ONU and the calibration record.

Further, a third message is sent to the ONU when an OLT-expected wavelength channel ID is not in the calibration record, so as to request the ONU to perform wavelength channel calibration for a wavelength channel identified by the OLT-expected wavelength channel ID, where the OLT-expected wavelength channel ID is an operating wavelength channel ID allocated by the OLT to the ONU.

The third message further includes an expected wavelength channel indication bit and is used to instruct the ONU to perform wavelength channel calibration for the OLT-expected wavelength channel and use the calibrated OLT-expected wavelength channel as an operating wavelength channel of the ONU.

Further, a method used by the ONU to calibrate the new wavelength channels may further specifically include:

sending a fourth message to the ONU when an OLT-expected wavelength channel ID is not in the calibration record, where the fourth message includes a wavelength channel calibration indication bit and is used to instruct the ONU to calibrate all new wavelength channels or instruct the ONU to calibrate a specified new wavelength channel, where the all new wavelength channels include an OLT-expected wavelength channel identified by the OLT-expected wavelength channel ID and the specified new wavelength channel, and the specified new wavelength channel is determined according to an ID of a to-be-calibrated wavelength channel in the fourth message or determined according to a quantity of to-be-calibrated wavelength channels and IDs of the to-be-calibrated wavelength channels in the fourth message.

Further, the method used by the ONU to calibrate the new wavelength channels may further specifically include:

sending a fifth message to the ONU when an OLT-expected wavelength channel ID is not in the calibration record, where the fifth message includes an ONU deactivation indication bit and is used to instruct the ONU to get deactivated and then calibrate all new wavelength channels before re-registration, where the all new wavelength channels include an OLT-expected wavelength channel identified by the OLT-expected wavelength channel ID.

S208. The ONU receives the first message, and according to the forced wavelength switching flag, performs wavelength channel calibration for a target wavelength channel to switch to, and instructs the ONU to switch to the calibrated target wavelength channel.

Further, the first message further includes a forced calibration flag; and the method further includes:

calibrating, by the ONU, all new wavelength channels according to the forced calibration flag, and switching to the target wavelength channel, where new wavelength channel IDs corresponding to the new wavelength channels are not in the calibration record, and the new wavelength channels include the target wavelength channel.

Further, the ONU receives a third message sent by the OLT; and the method further includes:

performing, by the ONU according to the third message, wavelength channel calibration for a wavelength channel identified by an OLT-expected operating wavelength channel ID, where the OLT-expected wavelength channel ID is an operating wavelength channel ID allocated by the OLT to the ONU.

Further, the third message further includes an expected wavelength channel indication bit; and the method further includes:

performing, by the ONU according to the expected wavelength channel indication bit, wavelength channel calibration for the OLT-expected wavelength channel and using the calibrated OLT-expected wavelength channel as an operating wavelength channel of the ONU.

Further, the ONU receives a fourth message sent by the OLT, where the fourth message includes a wavelength channel calibration indication bit; and the ONU calibrates all new wavelength channels according to the wavelength channel calibration indication bit; or the ONU calibrates a specified new wavelength channel according to the wavelength channel calibration indication bit, where the all new wavelength channels include an OLT-expected wavelength channel identified by an OLT-expected wavelength channel ID and the specified new wavelength channel, and the specified new wavelength channel is a wavelength channel specified according to an ID of a to-be-calibrated wavelength channel in the fourth message or is a wavelength channel specified according to a quantity of to-be-calibrated wavelength channels and IDs of the to-be-calibrated wavelength channels in the fourth message.

Further, the ONU receives a fifth message sent by the OLT, where the fifth message includes an ONU deactivation indication bit; and the ONU calibrates all new wavelength channels according to the ONU deactivation indication bit before re-registration, where the new wavelength channels include an OLT-expected wavelength channel identified by an OLT-expected wavelength channel ID, where the OLT-expected wavelength channel ID is an operating wavelength channel ID allocated by the OLT to the ONU.

S210. The OLT performs data communication with the ONU over the calibrated target wavelength channel.

In this embodiment of the present invention, an ONU reports a calibration record of the ONU, where the calibration record includes an ID of a calibrated wavelength channel; an OLT sends a first message to the ONU when determining, according to the calibration record, that a target wavelength channel ID corresponding to a target wavelength channel to which the ONU needs to switch is not in the calibration record, where the first message includes a forced wavelength switching flag; the ONU performs, according to the forced wavelength switching flag, wavelength channel calibration for the target wavelength channel to switch to, and instructs the ONU to switch to the calibrated target wavelength channel. In this way, the ONU can implement wavelength switching quickly after calibrating a new wavelength channel so as to perform data communication over the calibrated new wavelength channel, thereby expanding a capacity of a system by effectively using the new wavelength channel and improving bandwidth utilization of the system.

The following uses Embodiment 2, Embodiment 3 and Embodiment 4 to give more details about the communications method provided in the foregoing embodiment, where the details are given based on the network architecture provided in FIG. 1 and according to the communications method provided in Embodiment 1. Specifically, Embodiment 2 is used to detail an ONU registration authentication process performed by an OLT according to a calibration record reported by an ONU; Embodiment 3 is used to detail a process in which an ONU switches, after calibrating an OLT-expected wavelength channel, to the expected wavelength channel; Embodiment 4 is used to detail a process of calibration performed by an ONU for a new wavelength channel.

Embodiment 2

Figure 3:
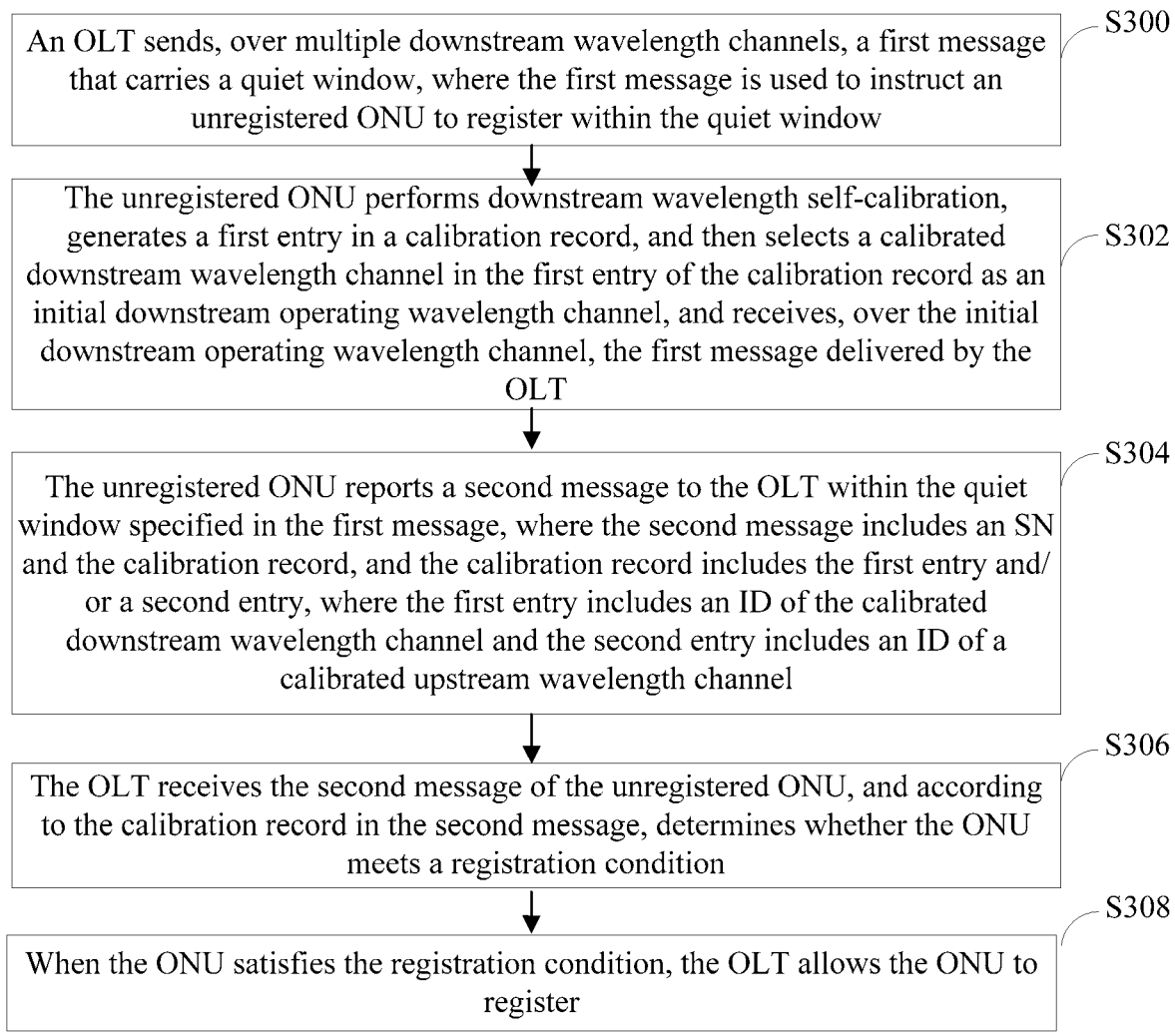
FIG. 3 is a schematic flowchart of an ONU registration method of a passive optical network according to an embodiment of the present invention.

FIG. 3 gives a schematic flowchart of an ONU registration method of a passive optical network according to an embodiment of the present invention. The method may be applied in the network architecture shown in FIG. 1, and the method may be executed by an apparatus that executes the communications method. For example, the method may be executed by an ONU or an OLT. As shown in FIG. 3, the method includes:

S300. An OLT sends, over multiple downstream wavelength channels, a first message that carries a quiet window, where the first message is used to instruct an unregistered ONU to register within the quiet window.

The first message may be any one of the following messages: a physical layer operation, administration and maintenance (PLOAM) message, an ONT management and control interface (OMCI) message, a Multi-Point Control Protocol (MPCP) message, and an operation, administration and maintenance (OAM) message, or may be other messages.

S302. The unregistered ONU performs downstream wavelength self-calibration, generates a first entry in a calibration record, and then selects a calibrated downstream wavelength channel in the first entry of the calibration record as an initial downstream operating wavelength channel, and receives, over the initial downstream operating wavelength channel, the first message delivered by the OLT.

A specific process of generating the first entry in the calibration record is as follows:

If an ONU type is an ONU whose wavelengths are pre-calibrated at delivery, the ONU traverses pre-calibrated downstream wavelengths, and establishes a correspondence between the downstream wavelengths and downstream wavelength channels; and if an ONU type is an ONU whose wavelengths are not calibrated at delivery, the ONU performs wavelength scan (the ONU changes the downstream wavelength continuously according to a specific step size), and establishes a correspondence between downstream wavelengths and downstream wavelength channels. The downstream wavelength channel in the correspondence is determined by the ONU according to a received downstream wavelength channel ID that is broadcast by the OLT.

Further, the ONU uses an ID corresponding to a downstream wavelength channel in the established correspondence, that is, a downstream wavelength channel ID, as the first entry of the calibration record.

The specific process of generating the first entry in the calibration record is applicable to both unregistered ONUs and registered ONUs.

S304. The unregistered ONU reports a second message to the OLT within the quiet window specified in the first message, where the second message includes an SN and the calibration record, and the calibration record includes the first entry and/or a second entry, where the first entry includes an ID of the calibrated downstream wavelength channel and the second entry includes an ID of a calibrated upstream wavelength channel.

Specifically, after generating the second entry in the calibration record, the ONU uses the second message to carry the calibration record that includes the first entry generated in the foregoing step S302 and the generated second entry, and sends the second message to the OLT.

A specific process of generating the second entry in the calibration record is as follows:

If an ONU type is an ONU whose wavelengths are pre-calibrated at delivery, the ONU traverses pre-calibrated upstream wavelengths, and establishes a correspondence between the upstream wavelengths and upstream wavelength channels; and if an ONU type is an ONU whose wavelengths are not calibrated at delivery, the ONU performs wavelength scan (the ONU changes the upstream wavelength continuously according to a specific step size), and establishes a correspondence between upstream wavelengths and upstream wavelength channels. The upstream wavelength channel in the correspondence is determined by the OLT by performing detection according to an optical signal sent by the ONU.

A specific process of determining the upstream wavelength channel by the OLT is:

The OLT receives an optical signal sent by the ONU, determines an upstream wavelength channel that receives the optical signal, and delivers an ID corresponding to the determined upstream wavelength channel to the ONU, so that the ONU establishes a correspondence between the upstream wavelength and the upstream wavelength channel, where the upstream wavelength channel is an upstream wavelength channel corresponding to the upstream channel ID.

Further, the ONU uses an ID corresponding to an upstream wavelength channel in the established correspondence, that is, an upstream wavelength channel ID, as the second entry of the calibration record.

The specific process of generating the second entry in the calibration record is applicable to both unregistered ONUs and registered ONUs.

Further, the second message may be any one of: a PLOAM message, an OMCI message, an MPCP message or an OAM message, or may be other messages.

The ONU may use any one of the PLOAM message, the OMCI message, the MPCP message or the OAM message or other types of messages to carry the SN and the calibration record.

That a PLOAM message is used to carry the SN and the calibration record is used as an example, and a message format of the PLOAM message is shown in Table 1.

TABLE 1

| Octet (Octet) | Content (Content) | Description (Description) |
|---|---|---|
| 1-2 | ONU ID (ONU ID) | ID of an optical network unit that needs to switch to a backup wavelength channel |
| 3 | Message type ID (Message type ID) | Identifies a type of the message |
| 4 | Sequence number (Sequence No) | Sequence number |
| 5-40 | Message content (Message Content) | May be used to carry the "calibration record" |
| 41-48 | Message integrity check (MIC) | Message integrity check |

Table 1 is a schematic diagram of a PLOAM message format. The PLOAM message generally includes an optical network unit ID (ONU ID) field, a message type ID field, a sequence number field, a message content field, and a message integrity check field. In this embodiment of the present invention, the SN and the calibration record may be carried in the message content field of the PLOAM message, as shown in Table 1.

Specifically, a message format, in which the message content in octets 5-40 in Table 1 carries the SN and the calibration record, may be shown in Table 2.

TABLE 2

| Octet | Content | Description |
|---|---|---|
| 1-2 | 0x03FF | No ONU ID is allocated to the ONU yet |
| 3 | 0x01 | ONU sequence number |
| 4 | 0x00 | Message sequence number |
| 5-16 | . . . | . . . |
| 17 | 0000 00TT (optional) | TT: Calibration type of the ONU<br>TT = 00: ONU whose wavelengths are not calibrated at delivery<br>TT = 01: ONU whose wavelengths are pre-calibrated at delivery |
| 18 | AAAA BBBB | AAAA: quantity of calibrated downstream wavelength channels<br>BBBB: quantity of calibrated upstream wavelength channels |
| 19 | 0000 DDDD | ID of a calibrated downstream wavelength channel |
| . . . | . . . | . . . |
| . . . | 0000 UUUU | ID of a calibrated upstream wavelength channel |
| . . . | . . . | . . . |
| 41-48 | Message integrity check | Message integrity check |

In the foregoing Table 2, octets 19–n (n is an integer, and n>19) are new mandatory fields, octets 19–n are filled with a "calibration record", where the calibration record further includes an ID of a calibrated wavelength channel, where the ID of the calibrated wavelength channel may include an ID of a calibrated downstream wavelength channel or an ID of a calibrated upstream wavelength channel; or the ID of a calibrated wavelength channel includes an ID of a calibrated downstream wavelength channel and an ID of a calibrated upstream wavelength channel. "0000 DDDD" may be used to indicate the ID of the calibrated downstream wavelength channel and "0000 UUUU" may be used to indicate the ID of the calibrated upstream wavelength channel, where DDDD and UUUU are binary values. For example, if "0000 DDDD" with a value of "0000 0000" indicates that the ID of the calibrated downstream wavelength channel is 0; and "0000 UUUU" with a value of "0000 0000" indicates that the ID of the calibrated upstream wavelength channel is 0. It should be understood that it is not unique to fill the "calibration record" in octets 19–n, and the "calibration record" may also be located in other octets of the message.

Optionally, octet 17 is a new optional octet, octet 17 is filled with an "ONU calibration type", and "0000 00TT" may be used to denote a standard ONU type. When TT=00, it indicates an ONU whose wavelengths are not calibrated at delivery; and when TT=01, it indicates an ONU whose wavelengths are pre-calibrated at delivery.

Optionally, octet 18 may be a new optional field, and octet 18 is filled with a "quantity of calibrated wavelength channels". "AAAABBBB" may be used to denote the "quantity of calibrated wavelength channels". Specifically, "AAAA" denotes the quantity of calibrated upstream wavelength channels and "BBBB" denotes the quantity of calibrated downstream wavelength channels, where AAAA and BBBB are binary values. For example, "AAAA" with a value of "0001" indicates that the quantity of calibrated downstream wavelength channels is 1; and "BBBB" with a value of "0001" indicates that the quantity of calibrated upstream wavelength channels is 1.

Information of other fields of the message is described below: Octets 1-2 in the PLOAM message are filled with an ONU ID field, where the ONU-ID with a value of 0x03FF indicates that no ONU-ID has been allocated to the ONU by now; octet 3 is filled with a "message type ID", and "0x01" may be used to denote an ONU sequence number if the message type is an ONU sequence number; octet 4 is filled with a "sequence number", and denotes a broadcast message sequence number or a unicast message sequence number, which may be denoted by "0x00"; octets 5-16 may be filled with a "vendor ID", a "vendor specific serial number (VSSN)", a "random delay", or other information, where a specific style of the filling is not limited; octets n–40 (19<n<40, and n is an integer) are filled with "transmit end data" or "receive end data" or other content; and octets 41-48 are used for message integrity check MIC.

It should be understood that, in the foregoing message format, field values, field lengths, and positions of the fields in the message, may be determined according to actual needs and are not limited to description of the specific fields in the foregoing table.

From the description of the foregoing Table 1, it can be learned that the second message reported by the unregistered ONU carries at least an SN and a calibration record, and may also carry an ONU calibration type or a quantity of calibrated wavelength channels.

S306. The OLT receives the second message of the unregistered ONU, and according to the calibration record in the second message, determines whether the ONU meets a registration condition.

Specifically, the OLT acquires calibrated upstream and downstream wavelength channels of the ONU from the calibration record, and according to the acquired calibrated upstream and downstream wavelength channels of the ONU, determines whether the ONU meets the registration condition.

The ONU registration condition is: The ONU has calibrated a pair of bound upstream and downstream wavelength channels, and the pair of bound upstream and downstream wavelength channels is OLT-expected upstream and downstream operating wavelength channels, and the pair of bound upstream and downstream wavelength channels, which has been calibrated by the ONU, is in the calibration record, where the OLT-expected upstream and downstream operating wavelength channels are upstream and downstream operating wavelength channels allocated by the OLT to the ONU. That is, according to the calibration record, the OLT determines that an OLT-expected wavelength channel ID is in the calibration record, and then allows the ONU to register.

S308. When the ONU meets the registration condition, the OLT allows the ONU to register.

In this embodiment of the present invention, according to an SN and a calibration record reported by an unregistered ONU at registration, an OLT performs registration authentication for the unregistered ONU, thereby ensuring that the ONU can work normally on an expected operating wavelength channel after the registration, which implements quick authentication of the ONU by the OLT and improves system reliability.

Embodiment 3

Figure 4:
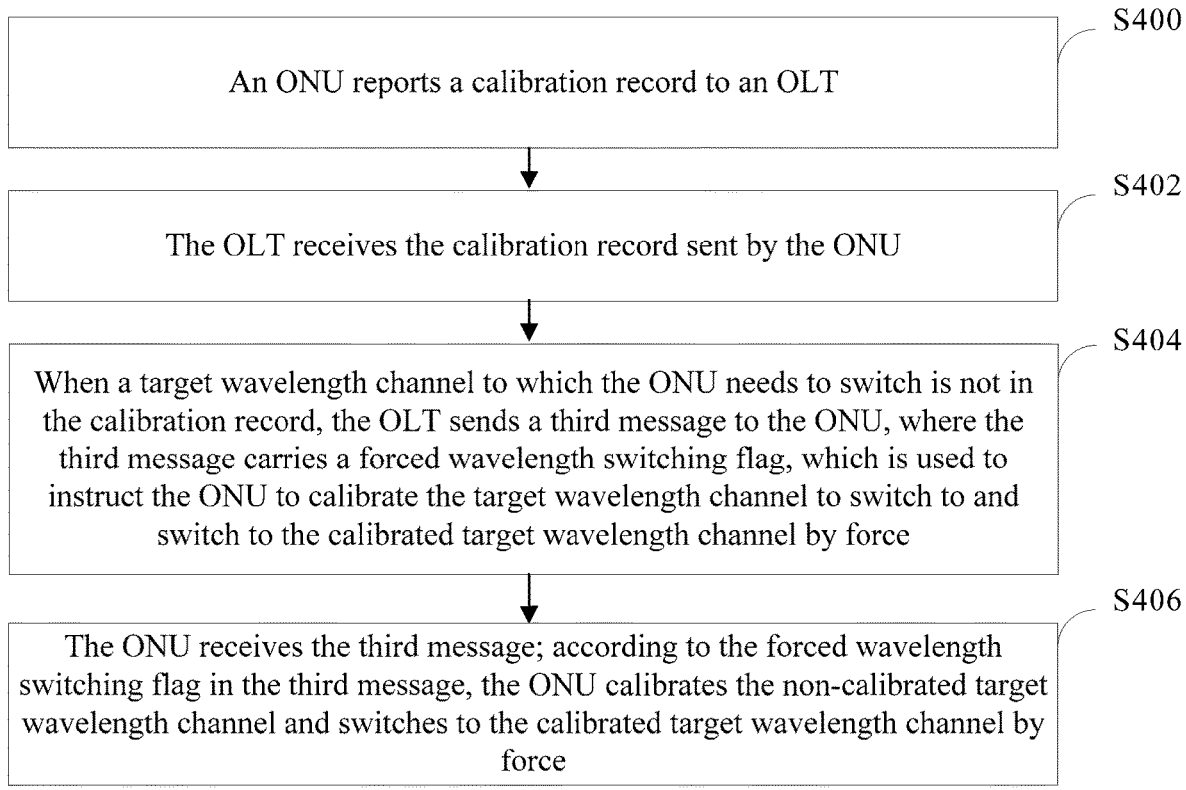
FIG. 4 is a schematic flowchart of a wavelength channel switching method according to an embodiment of the present invention.

As shown in FIG. 4, FIG. 4 is a schematic flowchart of a wavelength channel switching method according to an embodiment of the present invention.

It should be understood that the method process shown in FIG. 4 may be further actions after Embodiment 2 or may be a method process independent of Embodiment 2.

The method process shown in FIG. 4 may also, based on the architecture in FIG. 1, specifically deal with addition of a new wavelength channel in a passive optical network system, where the new wavelength channel may be a non-calibrated wavelength channel. It should be understood that wavelength channels involved in the two scenarios described below may be both understood as new wavelength channels added in the passive optical network system. First, in view of energy efficiency of an OLT in an existing system, when there are few users or a small traffic volume in a live network, an ONU is switched to some wavelength channels or even a single wavelength channel, and other remaining wavelength channels are disabled to achieve a purpose of energy saving. As regards operating wavelength channels that are currently used by the ONU, the operating wavelength channels are wavelength channels already calibrated by the ONU. However, subsequently, due to an increase of a service scale, the wavelength channels that are previously disabled for energy saving need to be enabled again. The re-enabled wavelength channels, which are previously disabled for energy saving, may be understood as the new wavelength channels mentioned above. Second, when the passive optical network system is upgraded and expanded from previously 4 wavelength channels to 8 wavelength channels, 4 newly added wavelength channels are the new wavelength channels mentioned above, where the 4 wavelength channels are given merely as an example without limitation to 4 wavelength channels.

With reference to the application scenario mentioned above, the wavelength switching method of an ONU is described below.

S400. An ONU reports a calibration record to an OLT.

Specifically, the calibration record includes a first entry and/or a second entry, where the first entry includes an ID of a calibrated downstream wavelength channel and the second entry includes an ID of a calibrated upstream wavelength channel.

S402. The OLT receives the calibration record sent by the ONU.

As regards a specific process of generating the calibration record by the ONU, reference may be made to the "specific process of generating the first entry in the calibration record" and the "specific process of generating the second entry in the calibration record" in step S302 and step S304 in Embodiment 1, and no repeated description is given herein.

Specifically, the ONU may, in the ONU registration process in Embodiment 1, report the calibration record to the OLT by adding the calibration record into the second message in Embodiment 1, which is a most preferred embodiment. Certainly, the ONU may also send a message that carries the calibration record to the OLT, and no limitation is imposed herein.

S404. When a target wavelength channel to which the ONU needs to switch is not in the calibration record, the OLT sends a third message to the ONU, where the third message carries a forced wavelength switching flag, which is used to instruct the ONU to calibrate the target wavelength channel to switch to and switch to the calibrated target wavelength channel by force.

Optionally, the third message may further include a forced calibration flag, used for the OLT to decide, before the ONU performs wavelength switching and according to the forced calibration flag, whether to calibrate a new wavelength channel. Specifically, if a value of the forced calibration flag is 1, the ONU switches to the target wavelength channel after completing calibration of all new wavelength channels; and if a value of the forced calibration flag is 0, the ONU switches to the target wavelength channel directly.

Further, it may be understood that, whether a target wavelength channel needs to be calibrated is decided by the value of the forced wavelength switching flag, and whether a new wavelength channel needs to be calibrated is decided by the value of the forced calibration flag.

Specifically, the OLT may extract the calibration record from the message that is reported by the ONU and includes the calibration record. Preferably, at registration, the ONU may report the calibration record to the OLT by adding the calibration record into a message that carries an SN. For this manner, reference may be made to related method description of Embodiment 1.

Specifically, a format of the third message is described in Table 3.

TABLE 3

| Octet | Content | Description |
| --- | --- | --- |
| 1-2 | 0x03FF | ONU ID |
| 3 | 0x21 | Adjustment control message |
| 4 | Sequence number | Broadcast or unicast PLOAM message sequence number |
| 5 | Operation code (Operation Code) | 0—request operation |
| 7-8 | Upstream start count | Start time for upstream wavelength adjustment of the ONU |
| 9-10 | Downstream start count | Start time for downstream wavelength adjustment of the ONU |
| 11 | C00F 000R | C: forced calibration flag (optional) C = 1, the ONU switches to the target wavelength channel after completing calibration of all new wavelength channels C = 0, the ONU switches to the target wavelength channel directly F: forced wavelength switching flag F = 1, if the ONU does not support the targt wavelength channel, forced switching must be performed through self-calibration |

TABLE 3-continued

| Octet | Content | Description |
|---|---|---|
| | | F = 0, if the ONU does not support the target wavelength chanel, a corresponding error code is returned directly without forced switching<br>R:<br>R = 1, when the wavelength switching fails, the ONU is forced to roll back to a wavelength channel that works before the switching<br>R = 0, when the wavelength switching fails, the ONU is not forced to roll back to a wavelength channel that works before the switching |
| ... | ... | ... |
| 41-48 | Message integrity check MIC | Message integrity check |

Table 3 is described by using a format of a PLOAM message as an example, but is not limited to the PLOAM message.

In Table 3, octet 11 is a new field, and octet 11 is filled with a forced wavelength switching flag, which is used to instruct the ONU to calibrate a non-calibrated target wavelength channel and switch to the calibrated target wavelength channel by force.

Specifically, C00F 000R may be used to indicate a forced wavelength switching flag, which is detailed below:

The C value is used to indicate a forced calibration flag. That is, when the C value is 1, it indicates that the ONU switches to the calibrated target wavelength channel after the ONU completes calibration of all new wavelength channels; and when the C value is 0, it indicates that the ONU switches to the calibrated target wavelength channel directly.

The F value is a forced wavelength switching flag and is used to instruct the ONU to calibrate a non-calibrated target wavelength channel and instruct the ONU to switch to the calibrated target wavelength channel. When the F value is 1, no matter whether the ONU supports the target wavelength channel, forced switching needs to be performed through self-calibration; and when the F value is 0, for a target wavelength channel that is not supported by the ONU, a corresponding error code is returned directly without forced switching.

The R value is used to indicate, after wavelength switching fails, whether to perform forced rollback to the wavelength channel that works before the wavelength switching. That is, when the R value is 1, it indicates that when the wavelength switching fails, the ONU is forced to roll back to the wavelength channel that works before the switching; and when the R value is 0, it indicates that when the wavelength switching fails, the ONU is not forced to roll back to the wavelength channel that works before the switching.

Further, other fields of the PLOAM message are fields defined in the existing standard, and are described herein roughly rather than in detail. Octets 1-2 are filled with an ONU ID, and used to denote an ONU ID that is delivered to a specified ONU in a unicast manner; octet 3 is filled with a message type ID, where, for this message type ID, 0x21 may be used to indicate that the message is an adjustment control message, and may also be understood as a wavelength switching message; octet 4 is a sequence number, and is specifically a unicast PLOAM message sequence number or a broadcast PLOAM message sequence number; octet 5 is an operation code, and a value 0 indicates that the operation is a request operation; octets 7-8 are an upstream start count, whose value is used to denote start time for upstream wavelength adjustment of the ONU; octets 9-10 are a downstream start count, whose value is used to denote start time for downstream wavelength adjustment of the ONU; and octets 41-48 are used for message integrity check MIC.

It should be understood that, in the foregoing message format, field values, field lengths, and positions of the fields in the message may be determined according to actual needs and are not limited to description of the specific fields in the foregoing table.

It should be understood that, optionally, steps S300 and S302 may also be skipped for the OLT. That is, the OLT has no ONU calibration record reported by the ONU. In this case, the OLT sends a third message to the ONU, where the third message carries a forced wavelength switching flag, which is used to instruct the ONU to calibrate a non-calibrated target wavelength channel and switch to the calibrated target wavelength channel by force.

Further, when the target wavelength channel to which the ONU needs to switch is in the calibration record, the OLT sends a third message to the ONU, which is used to instruct the ONU to switch to the target wavelength channel. In this case, the third message sent by the OLT to the ONU does not carry a forced wavelength switching flag.

Specifically, when the ONU has multiple target wavelength channels, a wavelength channel in the calibration record may be selected preemptively as the target wavelength channel to switch to for the switching.

S406. The ONU receives the third message; according to the forced wavelength switching flag in the third message, the ONU calibrates the non-calibrated target wavelength channel and switches to the calibrated target wavelength channel by force.

Specifically, the ONU determines a value of the forced wavelength switching flag in the received third message. If the value is 1 and if the ONU does not support the target wavelength channel, forced switching is performed through self-calibration; or, if the value is 0 and if the ONU does not support the target wavelength channel, a corresponding error code is returned directly without forced switching.

Further, before the wavelength switching process, the ONU decides, according to a forced calibration flag, whether to calibrate a new wavelength channel. Optionally, the third message may further include the forced calibration flag, where the flag is used to decide, before the wavelength switching process, whether to calibrate the new wavelength channel. Specifically, if a value of the forced calibration flag is 1, the ONU switches to the target wavelength channel after completing calibration of all new wavelength channels; and if a value of the forced calibration flag is 0, the ONU switches to the target wavelength channel directly.

Further, it should be understood that, whether a target wavelength channel needs to be calibrated is decided by the value of the forced wavelength switching flag, and whether a new wavelength needs to be calibrated is decided by the value of the forced calibration flag.

In this embodiment of the present invention, according to a calibration record reported by an ONU, an OLT determines that a target wavelength channel to switch to is not in the calibration record, and therefore uses a forced wavelength switching flag to instruct the ONU to calibrate a non-calibrated target wavelength channel and switch to the calibrated target wavelength channel by force, thereby ensuring that the ONU can switch to a new wavelength channel. When the ONU has multiple optional target wavelength channels, a target wavelength channel recorded in the calibration record is calibrated preemptively, so that wavelength switching is performed quickly.

Embodiment 4

Figure 5:
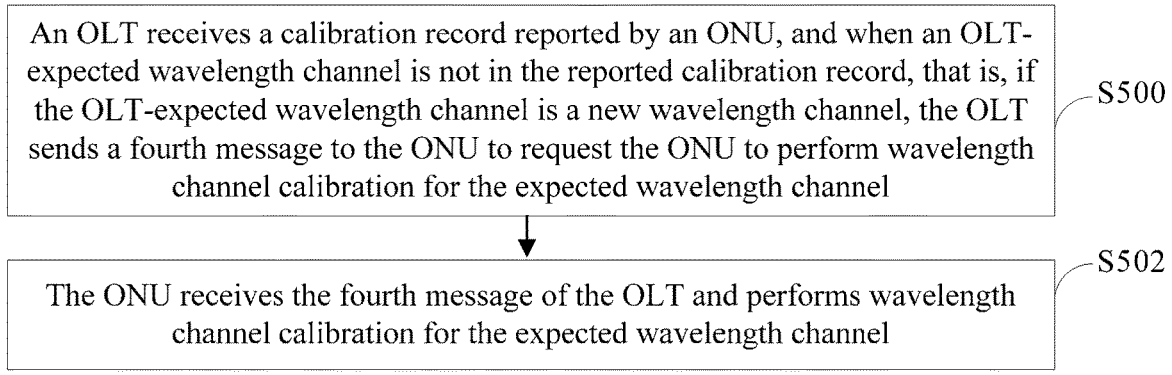
FIG. 5 shows a method for wavelength channel calibration of an ONU according to an embodiment of the present invention.

The following describes a wavelength channel calibration method according to a calibration record. Specifically, as shown in FIG. 5, FIG. 5 shows a method for wavelength channel calibration of an ONU, which is detailed below:

S500. An OLT receives a calibration record reported by an ONU, and when an OLT-expected wavelength channel is not in the reported calibration record, that is, if the OLT-expected wavelength channel is a new wavelength channel, sends a fourth message to the ONU to request the ONU to perform wavelength channel calibration for the expected wavelength channel.

Specifically, the OLT receives the calibration record, and according to the calibration record, queries whether the ONU-expected wavelength channel is in the calibration record. When the ONU-expected wavelength channel is not in the reported calibration record, the OLT instructs the ONU to perform wavelength channel calibration for the expected wavelength channel; or, when the ONU-expected wavelength channel is in the reported calibration record, the expected wavelength channel does not need to be calibrated any more. The calibration record includes a first entry and/or a second entry, where the first entry includes an ID of a calibrated downstream wavelength channel and the second entry includes an ID of a calibrated upstream wavelength channel.

Further, the fourth message may be obtained by extending any one of: a PLOAM message, an OMCI message, an MPCP message or an OAM message.

Optionally, the fourth message carries an expected wavelength channel indication bit, where the expected wavelength channel indication bit is used to instruct the ONU to perform wavelength channel calibration for the expected wavelength channel and then use the currently calibrated wavelength channel as a new operating wavelength channel or switch back, after completion of wavelength calibration, to an original wavelength channel.

A format of the fourth message is described in Table 4.

TABLE 4

| Octet | Content | Description |
| --- | --- | --- |
| 1-2 | 0x03FF | ONU ID |
| 3 | Message type ID | Calibration request (calibration request) |
| 4 | Sequence number (SN) | Broadcast or Unicast PLOAM sequence number. |
| 5 | 0000000R (optional) | R = 0: After completion of wavelength channel calibration, the currently calibrated wavelength channel is a new operating wavelength channel<br>R = 1: After completion of wavelength channel calibration, switch back to an original wavelength channel |
| 6-48 | ... | ... |

As shown in Table 4, a PLOAM message is used as an example of the fourth message for description.

New octets are octet 3 and octet 5. Octet 3 indicates that the message type ID is a calibration request.

Octet 5 is an optional field and is used to indicate to the ONU, after completion of wavelength calibration, whether the expected operating wavelength channel of the ONU works on the original wavelength channel, which may be indicated by 0000 000R. Specifically, R=0 indicates that, after completion of wavelength calibration, the current calibrated wavelength channel is a new operating wavelength channel; and R=1 indicates that, after completion of wavelength calibration, it is necessary to switch back to the original wavelength channel.

For octets 6-48, refer to the specific description of Table 3, and no repeated description is given herein.

The format of the fourth message may also be shown in the following Table 5. By using octets 5-6 in Table 5, the ONU is instructed to calibrate the expected wavelength channel, and the detailed format is as follows:

TABLE 5

| Octet | Content | Description |
| --- | --- | --- |
| 1-2 | 0x03FF | ONU ID |
| 3 | Message type ID | Calibration request |
| 4 | Sequence number | Broadcast or unicast PLOAM message sequence number |
| 5 | option | 0: Calibrate all new wavelength channels<br>1: Calibrate a wavelength channel specified by the subsequent field |
| 6 | DDDD UUUU | DDDD: ID of a downstream wavelength channel that needs to be calibrated<br>UUUU: ID of an upstream wavelength channel that needs to be calibrated |
| 7 | 0000 000R (optional) | R = 0: After completion of wavelength channel calibration, the current calibrated wavelength channel is a new operating wavelength channel<br>R = 1: After completion of wavelength channel calibration, switch back to the original wavelength channel |
| ... | ... | ... |

As shown in Table 5, the new octets 5-6 are used to denote wavelength channels that need to be calibrated by the ONU. Specifically, octet 5 is an option field. A "0" value of the option instructs the ONU to calibrate all new wavelength channels; and a "1" value of the option instructs the ONU to calibrate a wavelength channel specified in octet 6. Octet 6 is used to indicate which wavelength channels need to be calibrated in octet 5. Specifically, "DDDD" is an ID of a downstream wavelength channel that needs to be calibrated, and "UUUU" is an ID of an upstream wavelength channel that needs to be calibrated.

Octet 7 in Table 5 is a new optional field and is used to indicate to the ONU, after completion of wavelength channel calibration, whether the ONU works on the new operating wavelength channel or works on the original wavelength channel, which may be indicated by 0000 000R. Specifically, R=0 indicates that, after completion of wavelength channel calibration, the current calibrated wavelength channel is a new operating wavelength channel; and R=1 indicates that, after completion of wavelength channel calibration, it is necessary to switch back to the original wavelength channel.

For other octets, reference may be made to the description of corresponding octets in Table 1-4.

Another type of fourth message may be shown in the following Table 6. Table 6 differs from Table 5 in that a quantity of wavelength channels that need to be calibrated is added, so that wavelength channel calibration may be performed for multiple wavelength channels, as detailed below in Table 6.

TABLE 6

| Octet | Content | Description |
|---|---|---|
| 1-2 | 0x03FF | ONU ID |
| 3 | Message type ID | Calibration request |
| 4 | Sequence number | Broadcast or unicast PLOAM message sequence number |
| 5 | option | 0: Calibrate all new wavelength channels<br>1: Calibrate wavelength channels specified by the subsequent octets 6-7 |
| 6 | AAAA BBBB | AAAA: quantity of downstream wavelength channels that need to be calibrated<br>BBBB: quantity of upstream wavelength channels that need to be calibrated |
| 7 | 0000 DDDD | ID of a downstream wavelength channel that needs to be calibrated |
| ... | | |
| | 0000 UUUU | ID of an upstream wavelength channel that needs to be calibrated |
| ... | ... | ... |

In Table 6, the new octet 6 denotes the quantity of wavelength channels that need to be calibrated, where the quantity of wavelength channels that need to be calibrated may indicate multiple wavelength channels that need to be calibrated, which is a difference from Table 5, and in Table 5, the quantity of wavelength channels that need to be calibrated may be one. Specifically, this is denoted by "AAAA BBBB", where "AAAA" denotes the quantity of downstream wavelength channels that need to be calibrated, and "BBBB" denotes the quantity of upstream wavelength channels that need to be calibrated. In octets 7–n, "0000 DDDD" denotes an ID of a downstream wavelength channel that needs to be calibrated, and is used to identify a downstream wavelength channel that needs to be calibrated, and "0000 UUUU" denotes an ID of an upstream wavelength channel that needs to be calibrated, and is used to identify an upstream wavelength channel that needs to be calibrated.

For other octets, reference may be made to the description of corresponding octets in Table 5, where a value "1" of the option in octet 5 indicates calibration of wavelength channels specified by the subsequent octets 6-7. The octets are not described one by one in detail herein again.

S502. The ONU receives the fourth message of the OLT and performs wavelength channel calibration for the expected wavelength channel.

As regards a specific process of performing wavelength channel calibration by the ONU, reference may be made to the process of generating a calibration record by the ONU, that is, the "specific process of generating the first entry in the calibration record" and the "specific process of generating the second entry in the calibration record" in step S202 and step S204 in Embodiment 1, and no repeated description is given herein.

Specifically, in the ONU registration process in Embodiment 1, the ONU may report the calibration record to the OLT by adding the calibration record into the second message in Embodiment 1, which is a most preferred embodiment. Certainly, the ONU may also send a message that carries the calibration record to the OLT, and no limitation is imposed herein.

Optionally, according to the expected wavelength channel indication bit carried in the fourth message, the ONU performs wavelength channel calibration for the expected wavelength channel and then uses the currently calibrated wavelength channel as a new operating wavelength channel or switches back, after completion of wavelength calibration, to the original wavelength channel.

Figure 6:
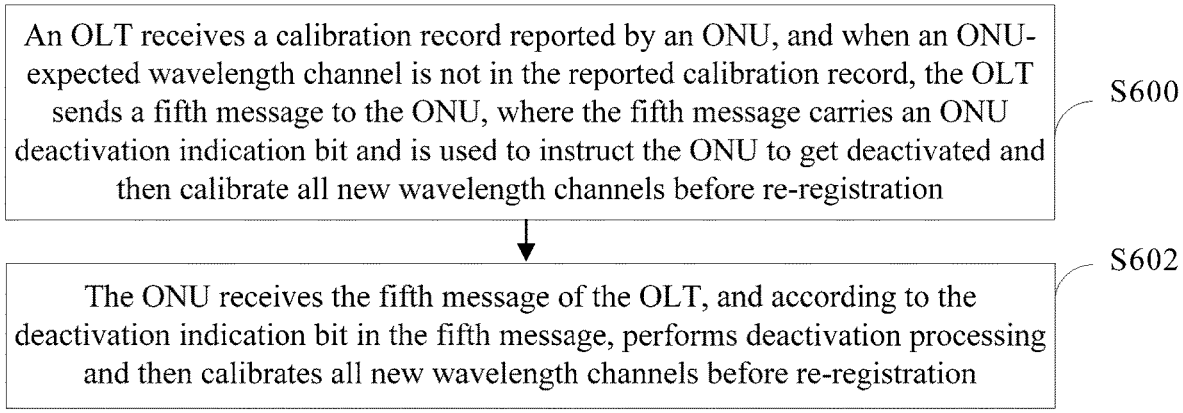
FIG. 6 shows another method for wavelength channel calibration of an ONU according to an embodiment of the present invention.

As shown in FIG. 6, FIG. 6 shows another method for wavelength channel calibration of an ONU, which is detailed below:

S600. An OLT receives a calibration record reported by an ONU, and when an ONU-expected wavelength channel is not in the reported calibration record, that is, if the ONU-expected wavelength channel is a new wavelength channel, the OLT sends a fifth message to the ONU, where the fifth message carries an ONU deactivation indication bit and is used to instruct the ONU to get deactivated and then calibrate all new wavelength channels before re-registration.

Specifically, the OLT receives the calibration record, and according to the calibration record, queries whether the ONU-expected wavelength channel is in the calibration record. When the ONU-expected wavelength channel is not in the reported calibration record, the OLT instructs the ONU to get deactivated and then calibrate all new wavelength channels before re-registration. When the ONU-expected wavelength channel is in the reported calibration record, the expected wavelength channel does not need to be calibrated any more. The calibration record includes a first entry and/or a second entry, where the first entry includes an ID of a calibrated downstream wavelength channel and the second entry includes an ID of a calibrated upstream wavelength channel.

Further, the fifth message may be obtained by extending any one of: a PLOAM message, an OMCI message, an MPCP message or an OAM message.

Optionally, the fifth message carries an expected wavelength channel indication bit, where the expected wavelength channel indication bit is used to instruct the ONU to perform wavelength channel calibration for the expected wavelength channel and then use a current calibrated wavelength channel as a new operating wavelength channel or switch back, after completion of wavelength calibration, to the original wavelength channel (the indication bit is not displayed in Table 7, and reference may be made to the description of Table 6).

The format of the fifth message may be shown in Table 7. A deactivation indication bit in octet 5 in Table 7 instructs the ONU to get deactivated and then calibrate all new wavelength channels before re-registration. It should be understood that a position, a length and the like of the deactivation indication in Table 7 are not limited to those in Table 7, and the position and the like may be changed according to various needs.

TABLE 7

| Octet | Content | Description |
|---|---|---|
| 1-2 | 0x03FF | ONU ID |
| 3 | 0x05 | Deactivate_ONU-ID (Deactivate_ONU-ID) |
| 4 | Sequence number | Unicast or broadcast PLOAM message sequence number |
| 5 | 0000 000F | F = 0: No operation requirement<br>F = 1: After being deactivated, the ONU calibrates all new wavelength channels before re-registration |

As shown in Table 7, the new octet 5 is used to instruct the ONU whether to calibrate all new wavelength channels, which may be denoted by "0000 000F". F=0 indicates that no operation requirement is imposed on the ONU, that is, the ONU does not need to perform calibration for the wavelength channel; and F=1 indicates that, after being deactivated, the ONU calibrates all new wavelength channels before re-registration Other octets are content defined by a standard PLOAM message, where octet 3 is a message type ID, and the message type ID is a Deactivate ONU ID (Deactivate ONU ID) message and may be denoted by 0x05.

For other octets, reference may be made to the description of corresponding octets in Table 3 or Table 4.

S602. The ONU receives the fifth message of the OLT, and according to the deactivation indication bit in the fifth message, performs deactivation processing and then calibrates all new wavelength channels before re-registration.

As regards a specific process of performing wavelength channel calibration by the ONU, reference may be made to the process of generating a calibration record by the ONU, that is, the "specific process of generating the first entry in the calibration record" and the "specific process of generating the second entry in the calibration record" in step S302 and step S304 in Embodiment 1, and no repeated description is given herein.

Specifically, in the ONU registration process in Embodiment 2, the ONU may report the calibration record to the OLT by adding the calibration record into the second message in Embodiment 2, which is a most preferred embodiment. Certainly, the ONU may also send a message that carries the calibration record to the OLT, and no limitation is imposed herein.

In the wavelength channel calibration method provided in this embodiment of the present invention, according to a calibration record reported by an ONU, an OLT instructs, by using different message indications, the ONU to calibrate a new wavelength channel, thereby implementing smooth expansion of a system and improving a utilization rate of system bandwidth.

Figure 7:
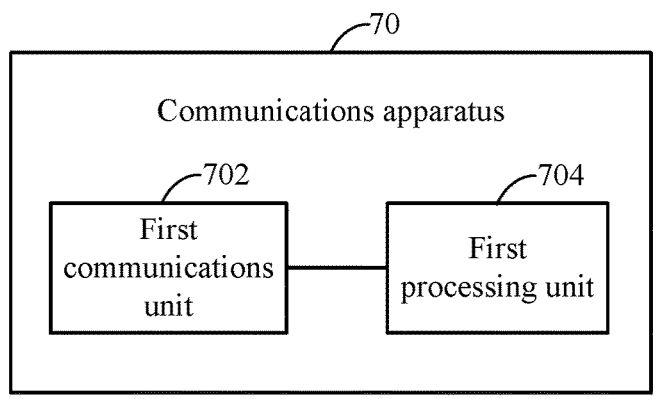
FIG. 7 is a communications apparatus architecture diagram of a passive optical network according to an embodiment of the present invention.

An apparatus provided in an embodiment of the present invention is shown in FIG. 7.

A passive optical network communications apparatus 70 is provided, where the apparatus includes:

a first communications unit 702, configured to: receive a calibration record reported by an optical network unit ONU, where the calibration record includes an ID of a calibrated wavelength channel; send a first message to the ONU according to an instruction of a first processing unit, where the first message includes a forced wavelength switching flag, where the forced wavelength switching flag is used to instruct the ONU to perform wavelength channel calibration for a target wavelength channel to switch to and instruct the ONU to switch to the calibrated target wavelength channel; and receive data sent by the ONU over the calibrated target wavelength channel; and the first processing unit 704, configured to: when the OLT determines, according to the calibration record, that a target wavelength channel ID corresponding to the target wavelength channel to which the ONU needs to switch is not in the calibration record, instruct the first communications unit to send the first message to the ONU.

The communications apparatus may be an OLT, and corresponds to the OLT in FIG. 1.

For specific functions of the OLT, refer to the specific description in the method embodiments in FIG. 1 to FIG. 6, and no repeated description is given herein.

The first communications unit may be a transceiver of the OLT. The first processing unit may be a MAC or a microprocessor, and the first processing unit may be implemented on a chip.

The first message further includes a forced calibration flag that is used to instruct the ONU to switch to the target wavelength channel after calibrating all new wavelength channels, where new wavelength channel IDs corresponding to the new wavelength channels are not in the calibration record, and the new wavelength channels include the target wavelength channel.

Further, the first communications unit is specifically configured to: send a second message to the ONU, where the second message includes a quiet window and is used to instruct the ONU to register within the quiet window; and receive, within the quiet window, a registration request reported by the ONU, where the registration request includes a sequence number of the ONU and the calibration record.

Further, the calibration record includes at least one of an ID of a calibrated upstream wavelength channel and an ID of a calibrated downstream wavelength channel.

Further, the calibration record includes at least one of an ID of a calibrated upstream wavelength channel and an ID of a calibrated downstream wavelength channel.

Further, the first processing unit is further configured to determine, according to the calibration record, that an OLT-expected wavelength channel ID is in the calibration record, and then allows the ONU to register, where the OLT-expected wavelength channel ID is an operating wavelength channel ID allocated by the OLT to the ONU.

Further, the first processing unit is further configured to: when an OLT-expected wavelength channel ID is not in the calibration record, instruct the first communications unit to send a third message to the ONU; and the first communications unit is further configured to: according to an instruction of the first processing unit, send a third message to the ONU, so as to request the ONU to perform wavelength channel calibration for a wavelength channel identified by the OLT-expected wavelength channel ID, where the OLT-expected wavelength channel ID is an operating wavelength channel ID allocated by the OLT to the ONU.

Further, the third message further includes an expected wavelength channel indication bit and is used to instruct the ONU to perform wavelength channel calibration for the OLT-expected wavelength channel and use the calibrated OLT-expected wavelength channel as an operating wavelength channel of the ONU.

Further, the first processing unit is further configured to: when an OLT-expected wavelength channel ID is not in the calibration record, instruct the first communications unit to send a fourth message to the ONU; and the first communications unit is further configured to send a fourth message to the ONU according to an instruction of the first processing unit, where the fourth message includes a wavelength channel calibration indication bit and is used to instruct the ONU to calibrate all new wavelength channels or instruct the ONU to calibrate a specified new wavelength channel, where the all new wavelength channels include an OLT-expected wavelength channel identified by the OLT-expected wavelength channel ID and the specified new wavelength channel, and the specified new wavelength channel is determined according to an ID of a to-be-calibrated wavelength channel in the fourth message or determined according to a quantity of to-be-calibrated wavelength channels and IDs of the to-be-calibrated wavelength channels in the fourth message.

Further, the first processing unit is further configured to: when an OLT-expected wavelength channel ID is not in the calibration record, instruct the first communications unit to send a fifth message to the ONU; and the first communications unit is further configured to send a fifth message to the ONU according to an instruction of the first processing unit, where the fifth message includes an ONU deactivation indication bit and is used to instruct the ONU to get deactivated and then calibrate all new wavelength channels before re-registration, where the all new wavelength channels include an OLT-expected wavelength channel identified by the OLT-expected wavelength channel ID.

It can be seen that, in this embodiment of the present invention, an optical network unit ONU reports a calibration record of the ONU, where the calibration record includes an ID of a calibrated wavelength channel; an OLT sends a first message to the ONU when determining, according to the calibration record, that a target wavelength channel ID corresponding to a target wavelength channel to which the ONU needs to switch is not in the calibration record, where the first message includes a forced wavelength switching flag; the ONU performs, according to the forced wavelength switching flag, wavelength channel calibration for the target wavelength channel to switch to, and instructs the ONU to switch to the calibrated target wavelength channel. In this way, the ONU can implement wavelength switching quickly after calibrating a new wavelength channel so as to perform data communication over the calibrated new wavelength channel, thereby expanding a capacity of a system by effectively using the new wavelength channel and improving bandwidth utilization of the system.

Figure 8:
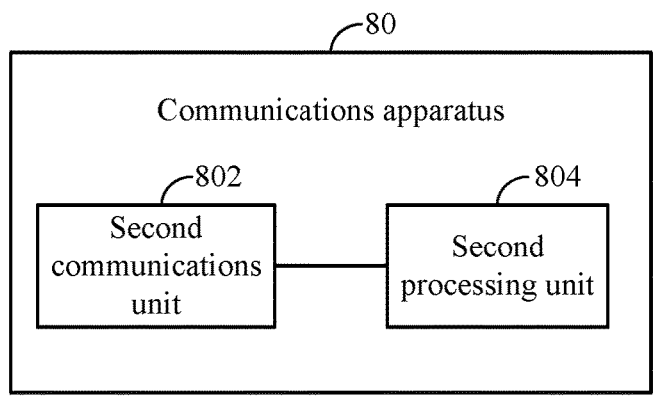
FIG. 8 is another communications apparatus architecture diagram of a passive optical network according to an embodiment of the present invention.
Figure 9:
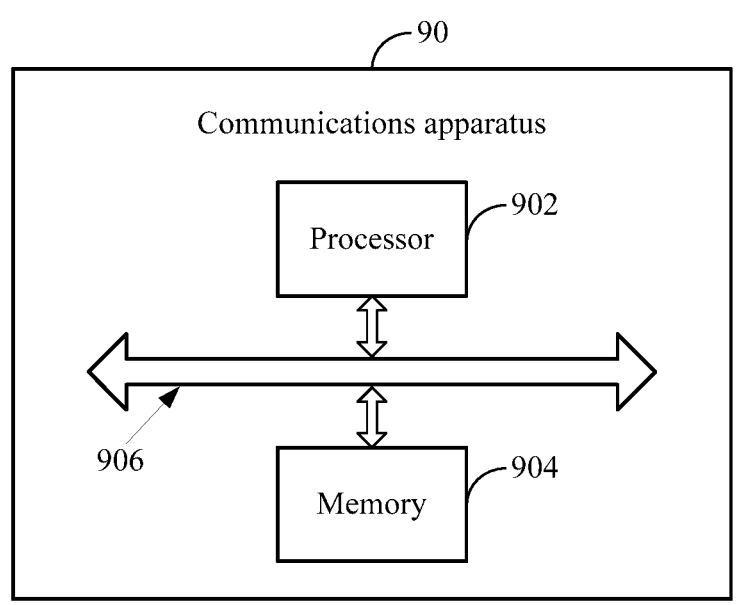
FIG. 9 is a schematic structural diagram of still another communications apparatus according to the present invention.

As shown in FIG. 8, an embodiment of the present invention further provides a passive optical network communications apparatus 80, whose specific structure is described below:

The communications apparatus 80 includes:

a second communications unit 802, configured to: report a calibration record to an optical line terminal OLT, where the calibration record includes an ID of a calibrated wavelength channel; and receive a first message sent by the OLT, where the first message includes a forced wavelength switching flag; and a second processing unit 804, configured to: perform, according to the forced wavelength switching flag, wavelength channel calibration for a target wavelength channel to switch to, and switch to the calibrated target wavelength channel; and perform, by the ONU, data communication with the OLT over the switched-to target wavelength channel.

The communications apparatus may be an ONU, and corresponds to the ONU in FIG. 1.

For specific functions of the ONU, refer to the specific description in the method embodiments in FIG. 1 to FIG. 6, and no repeated description is given herein.

The second communications unit may be a transceiver of the ONU. The second processing unit may be a MAC or a microprocessor, and functions of the second processing unit may be implemented on a chip of the ONU.

Further, the first message further includes a forced calibration flag, and the second communications unit is further configured to calibrate all new wavelength channels according to the forced calibration flag, and switch to the target wavelength channel, where new wavelength channel IDs corresponding to the new wavelength channels are not in the calibration record, and the new wavelength channels include the target wavelength channel.

Further, the second communications unit is specifically configured to: receive a second message sent by the OLT, where the second message includes a quiet window; send, by the ONU within the quiet window, a registration request to the OLT, where the registration request includes a sequence number of the ONU and the calibration record, and the calibration record is generated by the ONU; and receive, within the quiet window, the sequence number of the ONU and the calibration record that are reported by the ONU.

Further, the calibration record includes at least one of an ID of a calibrated upstream wavelength channel and an ID of a calibrated downstream wavelength channel.

Further, the calibration record further includes at least one of a quantity of calibrated downstream wavelength channels and a quantity of calibrated upstream wavelength channels.

Further, the second communications unit is further configured to receive a third message sent by the OLT; and the second processing unit is further configured to perform, according to the third message, wavelength channel calibration for a wavelength channel identified by an OLT-expected operating wavelength channel ID, where the OLT-expected wavelength channel ID is an operating wavelength channel ID allocated by the OLT to the ONU.

Further, the third message further includes an expected wavelength channel indication bit; and the second processing unit is further configured to: according to the expected wavelength channel indication bit, perform wavelength channel calibration for the OLT-expected wavelength channel and use the calibrated OLT-expected wavelength channel as an operating wavelength channel of the ONU.

Further, the second communications unit is further configured to receive a fourth message sent by the OLT, where the fourth message includes a wavelength channel calibration indication bit; and the second processing unit is further configured to: calibrate all new wavelength channels according to the wavelength channel calibration indication bit; or, calibrate a specified new wavelength channel according to the wavelength channel calibration indication bit, where the all new wavelength channels include an OLT-expected wavelength channel identified by an OLT-expected wavelength channel ID and the specified new wavelength channel, and the specified new wavelength channel is a wavelength channel specified according to an ID of a to-be-calibrated wavelength channel in the fourth message or is a wavelength channel specified according to a quantity of to-be-calibrated wavelength channels and IDs of the to-be-calibrated wavelength channels in the fourth message.

Further, the second communications unit is further configured to receive a fifth message sent by the OLT, where the fifth message includes an ONU deactivation indication bit; and the second processing unit is further configured to calibrate all new wavelength channels according to the ONU deactivation indication bit before re-registration, where the new wavelength channels include an OLT-expected wavelength channel identified by an OLT-expected wavelength channel ID, where the OLT-expected wavelength channel ID is an operating wavelength channel ID allocated by the OLT to the ONU.

It can be seen that, in this embodiment of the present invention, an optical network unit ONU reports a calibration record of the ONU, where the calibration record includes an ID of a calibrated wavelength channel; an OLT sends a first message to the ONU when determining, according to the calibration record, that a target wavelength channel ID corresponding to a target wavelength channel to which the ONU needs to switch is not in the calibration record, where the first message includes a forced wavelength switching flag; the ONU performs, according to the forced wavelength switching flag, wavelength channel calibration for the target wavelength channel to switch to, and instructs the ONU to switch to the calibrated target wavelength channel. In this way, the ONU can implement wavelength switching quickly after calibrating a new wavelength channel so as to perform data communication over the calibrated new wavelength channel, thereby expanding a capacity of a system by effectively using the new wavelength channel and improving bandwidth utilization of the system.

An embodiment of the present invention further provides a communications apparatus 90, as shown in FIG. 90.

The communications apparatus 90 includes: a processor 902, a memory 904, and a bus system 906, where the processor 902 is connected to the memory 904 via the bus system 904, the memory 904 is used to store instructions, and the processor 904 is used to execute the instructions stored by the memory 904. The processor 902 is configured to: when determining, according to a calibration record, that a target wavelength channel ID corresponding to a target wavelength channel to which an ONU needs to switch is not in the calibration record, send a first message to the ONU.

Alternatively, the processor 902 is configured to perform, according to a forced wavelength switching flag, wavelength channel calibration for a target wavelength channel to switch to, and switch to the calibrated target wavelength channel; and perform, by an ONU, data communication with the OLT over the switched-to target wavelength channel.

Further, for specific functions of the processor 902, reference may be made to the specific functions of the second processing unit 704 in the communications apparatus 70 in FIG. 7 or the second processing unit 804 in the communications apparatus 80 in FIG. 8 in the apparatus embodiments, and no repeated description is given herein.

It should be understood that, in this embodiment of the present invention, the processor 902 may be a central processing unit (CPU), and the processor 902 may also be another general purpose processor, a digital signal processor (DSP), an application-specific integrated circuit (ASIC), a field programmable gate array (FPGA) or other programmable logical device, a discrete gate or transistor logical device, a discrete hardware assembly, or the like. The general purpose processor may be a microprocessor, or the processor may also be any conventional processor or the like.

The memory 904 may include a read-only memory and a random access memory, and provide instructions and data for the processor 902. A part of the memory 904 may further include a non-volatile random access memory. For example, the memory 904 may further store device type information.

The bus system 906 may include not only a data bus but also a power supply bus, a control bus, a status signal bus and the like. However, for clear description, various buses are denoted by the bus system 906 in the diagram.

In an implementation process, steps of the foregoing methods may be implemented by using an integrated logical circuit in a hardware form or instructions in a software form in the processor 902. The steps of the methods disclosed with reference to the embodiments of the present invention may be directly implemented by a hardware processor, or may be implemented by a combination of hardware and a software module in a processor. The software module may be located in a storage medium that is mature in the art, such as a random access memory, a flash memory, a read-only memory, a programmable read-only memory, or an electrically erasable programmable memory, or a register. The storage medium is located in the memory 904, and the processor 904 reads information in the memory 904 and implements, in combination with its hardware, the steps of the foregoing methods. To avoid repetition, no detailed description is given herein again.

The present invention further provides a passive optical network system. Referring to FIG. 1, the passive optical network system at least includes an OLT and ONUs. The OLT is connected to the ONUs via an optical splitter. For functions implemented by the OLT, refer to FIG. 7 of the apparatus embodiments and the corresponding description of FIG. 7; and for functions implemented by the ONU, refer to FIG. 8 of the apparatus embodiments and the corresponding description of FIG. 8. Specifically:

The OLT is configured to: receive a calibration record reported by an optical network unit ONU, where the calibration record includes an ID of a calibrated wavelength channel; send a first message to the ONU when the OLT determines, according to the calibration record, that a target wavelength channel ID corresponding to a target wavelength channel to which the ONU needs to switch is not in the calibration record, where the first message includes a forced wavelength switching flag, where the forced wavelength switching flag is used to instruct the ONU to perform wavelength channel calibration for the target wavelength channel to switch to and instruct the ONU to switch to the calibrated target wavelength channel; and receive data sent by the ONU over the calibrated target wavelength channel.

The ONU is configured to: report the calibration record to the optical line terminal OLT, where the calibration record includes the ID of the calibrated wavelength channel; receive the first message sent by the OLT, where the first message includes the forced wavelength switching flag; according to the forced wavelength switching flag, perform wavelength channel calibration for the target wavelength channel to switch to, and switch to the calibrated target wavelength channel; and perform data communication with the OLT over the switched-to target wavelength channel.

For specific formats of various messages mentioned above, refer to the specific description of the corresponding embodiments in Embodiment 1 to Embodiment 4 of the method, and no repeated description is given herein.

In the passive optical network system provided in this embodiment of the present invention, an optical network unit receives a first message sent by an optical line terminal, where the first message carries backup wavelength channel ID information; when the optical network unit detects a fault, the optical network unit switches an operating wavelength channel of the optical network unit to a backup wavelength channel identified by the backup wavelength channel ID information; and the optical network unit performs data communication over the switched-to backup wavelength channel, thereby implementing fast protection switching of the passive optical network system and improving reliability of the system.

The present invention further provides a passive optical network system. Referring to FIG. 1, the passive optical network system at least includes an OLT and ONUs. The OLT is connected to the ONUs via an optical splitter. For functions implemented by the OLT, refer to FIG. 7 and the corresponding description of FIG. 7; and for functions implemented by the ONU, refer to FIG. 8 of the apparatus embodiments and the corresponding description of FIG. 8. Specifically:

The OLT is configured to: receive a calibration record reported by an optical network unit ONU, where the calibration record includes an ID of a calibrated wavelength channel; send a first message to the ONU when the OLT determines, according to the calibration record, that a target wavelength channel ID corresponding to a target wavelength channel to which the ONU needs to switch is not in the calibration record, where the first message includes a forced wavelength switching flag, where the forced wavelength switching flag is used to instruct the ONU to perform wavelength channel calibration for the target wavelength channel to switch to and instruct the ONU to switch to the calibrated target wavelength channel; and receive data sent by the ONU over the calibrated target wavelength channel.

The ONU is configured to: report the calibration record to the optical line terminal OLT, where the calibration record includes the ID of the calibrated wavelength channel; receive the first message sent by the OLT, where the first message includes the forced wavelength switching flag; according to the forced wavelength switching flag, perform wavelength channel calibration for the target wavelength channel to be switched to, and switch to the calibrated target wavelength channel; and perform, by the ONU, data communication with the OLT over the switched-to target wavelength channel.

In this embodiment of the present invention, an ONU reports a calibration record of the ONU, where the calibration record includes an ID of a calibrated wavelength channel; an OLT sends a first message to the ONU when determining, according to the calibration record, that a target wavelength channel ID corresponding to a target wavelength channel to which the ONU needs to switch is not in the calibration record, where the first message includes a forced wavelength switching flag; the ONU performs, according to the forced wavelength switching flag, wavelength channel calibration for the target wavelength channel to switch to, and instructs the ONU to switch to the calibrated target wavelength channel. In this way, the ONU can implement wavelength switching quickly after calibrating a new wavelength channel so as to perform data communication over the calibrated new wavelength channel, thereby expanding a capacity of a system by effectively using the new wavelength channel and improving bandwidth utilization of the system.

In the foregoing embodiments, the description of each embodiment has respective focuses. For a part that is not described in detail in an embodiment, reference may be made to related descriptions in other embodiments.

It should be noted that, for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also understand that all the embodiments described in this specification belong to exemplary embodiments, and the involved actions and modules are not necessarily mandatory to the present invention.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device, and may specifically be a processor in a computer device) to perform all or a part of the steps of the foregoing methods described in the embodiments of the present invention. The foregoing storage medium may include: any medium that can store program code, such as a USB flash drive, a removable hard disk, a magnetic disk, an optical disc, a read-only memory (ROM), or a random access memory (RAM).

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data communications method in a passive optical network, comprising:
   receiving, by an optical line terminal (OLT), a calibration record reported by an optical network unit (ONU), wherein the calibration record records all calibrated wavelength channels;
   determining, according to the calibration record, by the OLT, that a target wavelength channel to which the ONU needs to switch is not calibrated;
   sending a first message to the ONU based on the target wavelength channel which the ONU needs to switch not being calibrated, wherein the first message comprises a forced wavelength switching flag, wherein the forced wavelength switching flag is used to instruct the ONU to calibrate the target wavelength channel and instruct the ONU to switch to the calibrated target wavelength channel;
   receiving data sent by the ONU over the calibrated target wavelength channel; and
   sending a second message to the ONU when an OLT-expected wavelength channel is not calibrated, wherein the second message comprises a wavelength channel calibration indication bit and is used to instruct the ONU to calibrate all new wavelength channels or instruct the ONU to calibrate a specified new wavelength channel, wherein the all new wavelength channels comprise an OLT-expected wavelength channel identified by the OLT-expected wavelength channel ID and the specified new wavelength channel, and the specified new wavelength channel is determined according to an ID of a to-be-calibrated wavelength channel in the second message or determined according to a quantity of to-be-calibrated wavelength channels and IDs of the to-be-calibrated wavelength channels in the second message.

2. The data communications method according to claim 1, wherein the first message further comprises a forced calibration flag, which is used to instruct the ONU to switch to the target wavelength channel after all new wavelength channels are calibrated, wherein the new wavelength channels are not calibrated, new wavelength channels comprise the target wavelength channel.

3. The data communications method according to claim 1, wherein the receiving, by the OLT, the calibration record reported by the ONU comprises:
   sending, by the OLT, a third message to the ONU, wherein the third message comprises a quiet window and is used to instruct the ONU to register within the quiet window; and
   receiving, within the quiet window, a registration request reported by the ONU, wherein the registration request comprises a sequence number of the ONU and the calibration record.

4. The data communications method according to claim 3, further comprising: sending a fourth message to the ONU when an OLT-expected wavelength channel is not recorded in the calibration record, so as to request the ONU to perform wavelength channel calibration for a wavelength channel identified by an OLT-expected wavelength channel ID, wherein the OLT-expected wavelength channel ID is an operating wavelength channel ID allocated by the OLT to the ONU.

5. The data communications method according to claim 1, wherein the calibration record comprises at least one of an ID of a calibrated upstream wavelength channel and an ID of a calibrated downstream wavelength channel.

6. The data communications method according to claim 1, wherein the calibration record further comprises at least one of a quantity of calibrated downstream wavelength channels and a quantity of calibrated upstream wavelength channels.

7. The data communications method according to claim 1, further comprising:
   determining, by the OLT according to the calibration record, that an OLT-expected wavelength channel is calibrated; and
   allowing the ONU to register.

8. A data communications method in a passive optical network, comprising:
   reporting, by an optical network unit (ONU), a calibration record to an optical line terminal (OLT), wherein the calibration record records all calibrated wavelength channels;
   receiving, by the ONU, a first message sent by the OLT, wherein the first message comprises a forced wavelength switching flag;
   calibrating, by the ONU according to the forced wavelength switching flag, a target wavelength channel to switch to, and switching to the calibrated target wavelength channel; and
   performing, by the ONU, data communication with the OLT over the switched-to target wavelength channel;
   receiving, by the ONU, a second message sent by the OLT, wherein the second message comprises a wavelength channel calibration indication bit; and
   calibrating, by the ONU, all new wavelength channels according to the wavelength channel calibration indication bit; or
   calibrating, by the ONU, a specified new wavelength channel according to the wavelength channel calibration indication bit, wherein the all new wavelength channels comprise an OLT-expected wavelength channel identified by an OLT-expected wavelength channel ID and the specified new wavelength channel, and the specified new wavelength channel is a wavelength channel specified according to an ID of a to-be-calibrated wavelength channel in the second message or is a wavelength channel specified according to a quantity of to-be-calibrated wavelength channels and IDs of the to-be-calibrated wavelength channels in the second message.

9. The data communications method according to claim 8, wherein the first message further comprises a forced calibration flag; and
   the method further comprises:
   calibrating, by the ONU, all new wavelength channels according to the forced calibration flag, and switching to the target wavelength channel, wherein the new wavelength channels are not calibrated, and the new wavelength channels comprise the target wavelength channel.

10. The data communications method according to claim 8, wherein the reporting, by the ONU, the calibration record to the OLT comprises:
    receiving, by the ONU, a third message sent by the OLT, wherein the third message comprises a quiet window;
    sending, by the ONU within the quiet window, a registration request to the OLT, wherein the registration request comprises a sequence number of the ONU and the calibration record, wherein the calibration record is generated by the ONU; and
    receiving, within the quiet window, the sequence number of the ONU and the calibration record that are reported by the ONU.

11. The data communications method according to claim 10, further comprising:
    receiving, by the ONU, a fourth message sent by the OLT; and
    the method further comprises:
    performing, by the ONU according to the fourth message, wavelength channel calibration for a wavelength channel identified by an OLT-expected operating wavelength channel ID, wherein the OLT-expected wavelength channel ID is an operating wavelength channel ID allocated by the OLT to the ONU.

12. A passive optical network communications apparatus, comprising:
    a transceiver;
    a processor; and
    wherein the transceiver is configured to:
    receive a calibration record reported by an optical network unit (ONU), wherein the calibration record records all calibrated wavelength channels; send a first message to the ONU according to an instruction from the processor, wherein the first message comprises a forced wavelength switching flag, wherein the forced wavelength switching flag is used to instruct the ONU to calibrate a target wavelength channel and instruct the ONU to switch to the calibrated target wavelength channel; and receive data sent by the ONU over the calibrated target wavelength channel; and wherein the processor is configured to:
when a passive optical network communications apparatus (OLT) determines, according to the calibration record, that a target wavelength channel to which the ONU needs to switch is not calibrated, instruct the transceiver to send the first message to the ONU based on the target wavelength channel that the ONU needs to switch not being calibrated; and
when an OLT-expected wavelength channel is not calibrated, instruct the transceiver to send a second message to the ONU; and
wherein the transceiver is further configured to send a second message to the ONU according to an instruction of the processor, wherein the first message comprises a wavelength channel calibration indication bit and is used to instruct the ONU to calibrate all new wavelength channels or instruct the ONU to calibrate a specified new wavelength channel, wherein the all new wavelength channels comprise an OLT-expected wavelength channel identified by the OLT-expected wavelength channel ID and the specified new wavelength channel, and the specified new wavelength channel is determined according to an ID of a to-be-calibrated wavelength channel in the second message or determined according to a quantity of to-be-calibrated wavelength channels and IDs of the to-be-calibrated wavelength channels in the second message.

13. The communications apparatus according to claim 12, wherein the first message further comprises a forced calibration flag, which is used to instruct the ONU to switch to the target wavelength channel after all new wavelength channels are calibrated, wherein the new wavelength channels are not calibrated, and the new wavelength channels comprise the target wavelength channel.

14. The communications apparatus according to claim 12, wherein the transceiver is further configured to: send a third message to the ONU, wherein the third message comprises a quiet window and is used to instruct the ONU to register within the quiet window; and receive, within the quiet window, a registration request reported by the ONU, wherein the registration request comprises a sequence number of the ONU and the calibration record.

15. The communications apparatus according to claim 14, wherein the processor is further configured to: when an OLT-expected wavelength channel is not calibrated, instruct the transceiver to send a fourth message to the ONU; and
wherein the transceiver is further configured to: according to an instruction of the processor, send the fourth message to the ONU, so as to request the ONU to perform wavelength channel calibration for a wavelength channel identified by an OLT-expected wavelength channel ID, wherein the OLT-expected wavelength channel ID is an operating wavelength channel ID allocated by the OLT to the ONU.

16. The communications apparatus according to claim 12, wherein the processor is further configured to determine, according to the calibration record, that an OLT-expected wavelength channel is calibrated, and then allow the ONU to register.

17. A passive optical network communications apparatus, comprising:
a transceiver; and
a processor,
wherein the processor is configured to:
report a calibration record to an optical line terminal (OLT), wherein the calibration record records all calibrated wavelength channels;
receive a first message sent by the OLT, wherein the first message comprises a forced wavelength switching flag;
calibrate, according to the forced wavelength switching flag, a target wavelength channel to switch to, and switch to the calibrated target wavelength channel; and
perform, through an Optical Network Unit (ONU), data communication with the OLT over the switched-to target wavelength channel;
wherein the transceiver is further configured to receive a second message sent by the OLT, wherein the second message comprises a wavelength channel calibration indication bit and
wherein the processor is further configured to: calibrate all new wavelength channels according to the wavelength channel calibration indication bit; or, calibrate a specified new wavelength channel according to the wavelength channel calibration indication bit, wherein the all new wavelength channels comprise an OLT-expected wavelength channel identified by an OLT-expected wavelength channel ID and the specified new wavelength channel, and the specified new wavelength channel is a wavelength channel specified according to an ID of a to-be-calibrated wavelength channel in the second message or is a wavelength channel specified according to a quantity of to-be-calibrated wavelength channels and IDs of the to-be-calibrated wavelength channels in the second message.

18. The communications apparatus according to claim 17, wherein the first message further comprises a forced calibration flag; and
the transceiver is configured to calibrate all new wavelength channels according to the forced calibration flag, and switch to the target wavelength channel, wherein new wavelength channel channels are not calibrated, and the new wavelength channels comprise the target wavelength channel.

19. The communications apparatus according to claim 17, wherein the transceiver is configured to:
report a calibration record to the OLT, wherein the calibration record records all calibrated wavelength channels; and
receive a first message sent by the OLT, wherein the first message comprises a forced wavelength switching flag.

20. The communications apparatus according to claim 19, wherein the transceiver is further configured to:
receive a third message sent by the OLT, wherein the third message comprises a quiet window;
send, through the ONU within the quiet window, a registration request to the OLT, wherein the registration request comprises a sequence number of the ONU and the calibration record, and wherein the calibration record is generated by the ONU; and
receive, within the quiet window, the sequence number of the ONU and the calibration record that are reported by the ONU.

21. The communications apparatus according to claim 20, wherein the transceiver is further configured to receive a fourth message sent by the OLT; and
wherein the processor is further configured to perform, according to the fourth message, wavelength channel calibration for a wavelength channel identified by an OLT-expected operating wavelength channel ID, wherein the OLT-expected wavelength channel ID is an operating wavelength channel ID allocated by the OLT to the ONU.

22. The communications apparatus according to claim 21, wherein the transceiver is further configured to receive a fifth message sent by the OLT, wherein the fifth message comprises an ONU deactivation indication bit; and wherein the processor is further configured to calibrate all new wavelength channels according to the ONU deactivation indication bit before re-registration, wherein the new wavelength channels comprise an OLT-expected wavelength channel identified by an OLT-expected wavelength channel ID, wherein the OLT-expected wavelength channel ID is an operating wavelength channel ID allocated by the OLT to the ONU.

23. A passive optical network system, comprising:

a first communications apparatus and a second communications apparatus;

wherein the first communication apparatus comprises: a first transceiver and a first processor, wherein the first transceiver is configured to: receive a calibration record reported by an optical network unit (ONU), wherein the calibration record records all calibrated wavelength channels; send a first message to the ONU according to an instruction of the first processor, wherein the first message comprises a forced wavelength switching flag, wherein the forced wavelength switching flag is used to instruct the ONU to calibrate a target wavelength channel and instruct the ONU to switch to the calibrated target wavelength channel; and receive data sent by the ONU over the calibrated target wavelength channel;

wherein the first processor is configured to: when a passive optical network communications apparatus determines, according to the calibration record, that a target wavelength channel to which the ONU needs to switch is not calibrated, instruct the first transceiver to send the first message to the ONU based on the target wavelength channel which the ONU needs to switch not being calibrated;

wherein the first processor is further configured to when an OLT-expected wavelength channel is not calibrated, instruct the transceiver to send a second message to the ONU; and wherein the first transceiver is further configured to send a second message to the ONU according to an instruction of the processor, wherein the first message comprises a wavelength channel calibration indication bit and is used to instruct the ONU to calibrate all new wavelength channels or instruct the ONU to calibrate a specified new wavelength channel, wherein the all new wavelength channels comprise an OLT-expected wavelength channel identified by the OLT-expected wavelength channel ID and the specified new wavelength channel, and the specified new wavelength channel is determined according to an ID of a to-be-calibrated wavelength channel in the second message or determined according to a quantity of to-be-calibrated wavelength channels and IDs of the to-be-calibrated wavelength channels in the second message.

* * * * *

UNITED STATES PATENT AND TRADEMARK OFFICE
CERTIFICATE OF CORRECTION

PATENT NO. : 10,939,190 B2
APPLICATION NO. : 16/164309
DATED : March 2, 2021
INVENTOR(S) : Gao et al.

Page 1 of 1

It is certified that error appears in the above-identified patent and that said Letters Patent is hereby corrected as shown below:

In the Claims

Claim 17: Column 36, Line 12: "indication bit and" should read -- indication bit; and --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*